United States Patent
Martin et al.

(10) Patent No.: US 11,808,781 B2
(45) Date of Patent: Nov. 7, 2023

(54) METHODS AND SYSTEMS FOR DETERMINING VEHICLE SPEED AND BAROMETRIC PRESSURE

(71) Applicant: Ford Global Technologies, LLC, Dearborn, MI (US)

(72) Inventors: Douglas Martin, Canton, MI (US); John Rollinger, Troy, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 412 days.

(21) Appl. No.: 17/115,664

(22) Filed: Dec. 8, 2020

(65) Prior Publication Data
US 2022/0178964 A1 Jun. 9, 2022

(51) Int. Cl.
*G01P 21/02* (2006.01)
*G01P 5/14* (2006.01)
*B60S 3/04* (2006.01)

(52) U.S. Cl.
CPC .............. *G01P 21/025* (2013.01); *G01P 5/14* (2013.01); *G01P 21/02* (2013.01); *B60S 3/04* (2013.01)

(58) Field of Classification Search
CPC ........... G01P 21/02; G01P 21/025; G01P 5/14
See application file for complete search history.

(56) References Cited

U.S. PATENT DOCUMENTS

| | | | |
|---|---|---|---|
| 6,898,511 B2 | 5/2005 | Denz et al. | |
| 7,555,374 B2 | 6/2009 | Wu et al. | |
| 8,543,284 B2 | 9/2013 | Thor | |
| 2006/0025916 A1 | 2/2006 | Tanaka et al. | |
| 2011/0238373 A1* | 9/2011 | Foster | G01P 5/16 |
| | | | 702/183 |
| 2015/0219512 A1* | 8/2015 | Bruti | G01L 13/00 |
| | | | 701/14 |

* cited by examiner

*Primary Examiner* — Paul M. West
(74) *Attorney, Agent, or Firm* — Vincent Mastrogiacomo; McCoy Russell LLP

(57) ABSTRACT

Methods and systems are provided for utilization of vehicle speed and barometric pressure sensors. In one example, a method may include measuring a change in a barometric pressure resulting from a measured change in a vehicle speed, modeling the change in the barometric pressure based on a change in a ram-air pressure resulting from the change in the vehicle speed, and indicating a degraded barometric pressure measurement when a difference between the measured and the modeled change in the barometric pressure is greater than a threshold pressure difference.

17 Claims, 12 Drawing Sheets

METHODS AND SYSTEMS FOR DETERMINING VEHICLE SPEED AND BAROMETRIC PRESSURE

FIELD

The present description relates generally to methods and systems for determining vehicle speed and barometric pressure.

BACKGROUND/SUMMARY

Reliable determination of vehicle speed and barometric pressure (BP) aid in vehicle operation. For example, an accurate assessment of barometric pressure may be beneficial for vehicle diagnostic functions and engine strategies. BP is typically determined by way of either a dedicated BP sensor, or inferred by way of a manifold absolute pressure (MAP) sensor positioned in an intake of the engine. However, during some vehicle operating conditions, the BP sensor and/or inference may be unreliable, which may have adverse effects on engine controls and other diagnostics that utilize the BP data. Vehicle speed, as displayed on or by a vehicle speedometer, may be determined by a controller based on a number of revolutions of a wheel, as indicated by a wheel speed sensor positioned at each wheel of the vehicle, over a predetermined period of time. However, wheel speed sensors are susceptible to degradation and aging, which may reduce accuracy. Further, the addition of custom wheels, a change in tire pressure, and other factors may reduce vehicle speed accuracy below federal law regulations, even if the wheel speed sensors are accurate.

One approach to infer BP from existing sensors on the vehicle equates intake manifold pressure, if available, with barometric pressure during engine stopped conditions. In another example, correlations between throttle position, engine mass-airflow, and barometric pressure can be utilized in cooperation with engine breathing data. In another approach, global positioning system (GPS) data may be used to infer determine vehicle altitude, which can aid in inferring BP. Similarly, GPS devices can be utilized to estimate vehicle speed. However, the inventors herein have recognized potential issues with such systems. Problems with BP sensors and BP inference methods can be difficult to diagnose when operating on a level plane. Furthermore, due to under-hood packaging constraints, as well as cross-wind effects, the BP sensing method may not accurately capture the static BP. Furthermore, in a case where a vehicle is not equipped with a dedicated BP sensor, but rather BP is being inferred from a MAP sensor, there may be fewer options for rationalizing the BP with other vehicle on-board sensors. Furthermore, GPS devices are costly, and some vehicles may not be GPS-equipped. Further still, GPS accuracy and signal quality may be affected by factors including atmospheric effects, sky blockage, and GPS receiver quality. As such, determining BP and/or vehicle speed via GPS technology may be unreliable and costly.

In one example, the issues described above may be at least partially addressed by a method for a vehicle, comprising measuring a change in a barometric pressure resulting from a measured change in a vehicle speed, modeling the change in the barometric pressure based on a change in a ram-air pressure resulting from the change in the vehicle speed, and indicating a degraded barometric pressure measurement when a difference between the measured and the modeled change in the barometric pressure is greater than a threshold pressure difference. In this way, the technical effect of reliably determining a vehicle speed and a barometric pressure over a broad range of vehicle operating conditions, can be achieved. Furthermore, faulty or degraded vehicle speed and barometric pressure measurements can be timely diagnosed. Further still, in the event of these degraded measurements or sensors, reliable estimates of the vehicle speed and barometric pressure can be readily provided without additional sensors or devices, thereby reducing vehicle manufacturing costs and complexity. Further still, existing vehicle systems may be retrofitted with the methods and systems herein, in particular, while utilizing existing BP and Vs sensors and technology.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
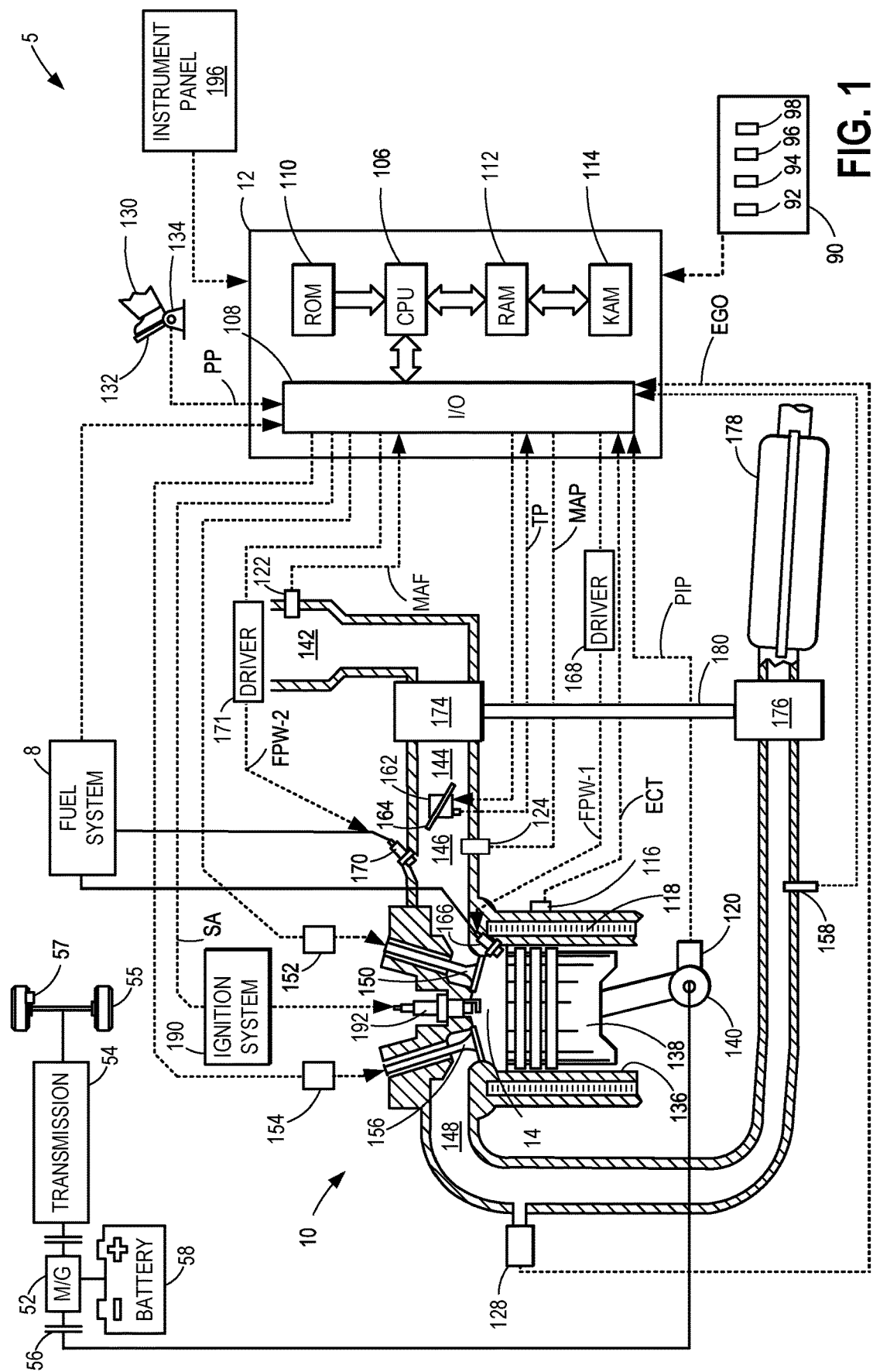
FIG. 1 shows a schematic of an example vehicle system.
Figure 12:
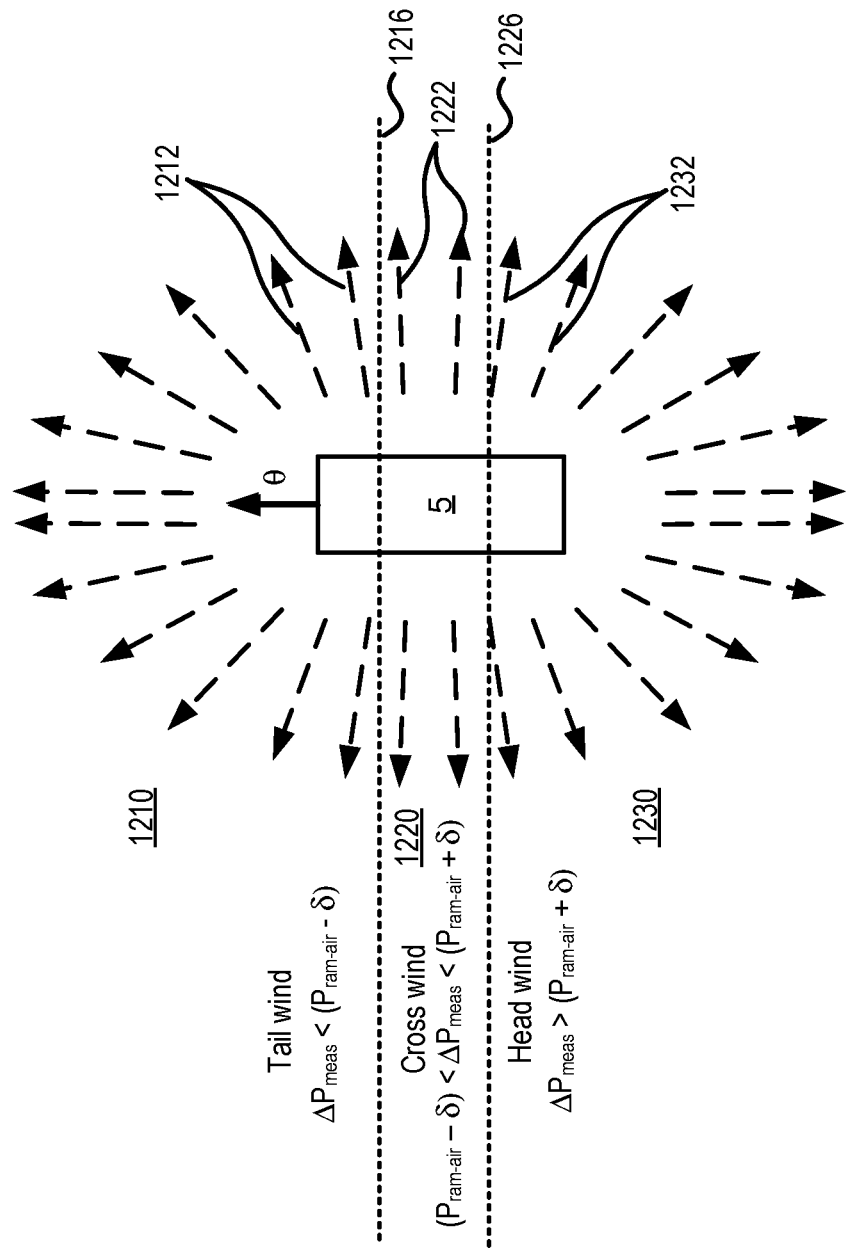
FIG. 12 shows an example schematic illustrating wind direction criteria for the methods of FIGS. 4-11.
Figure 13:
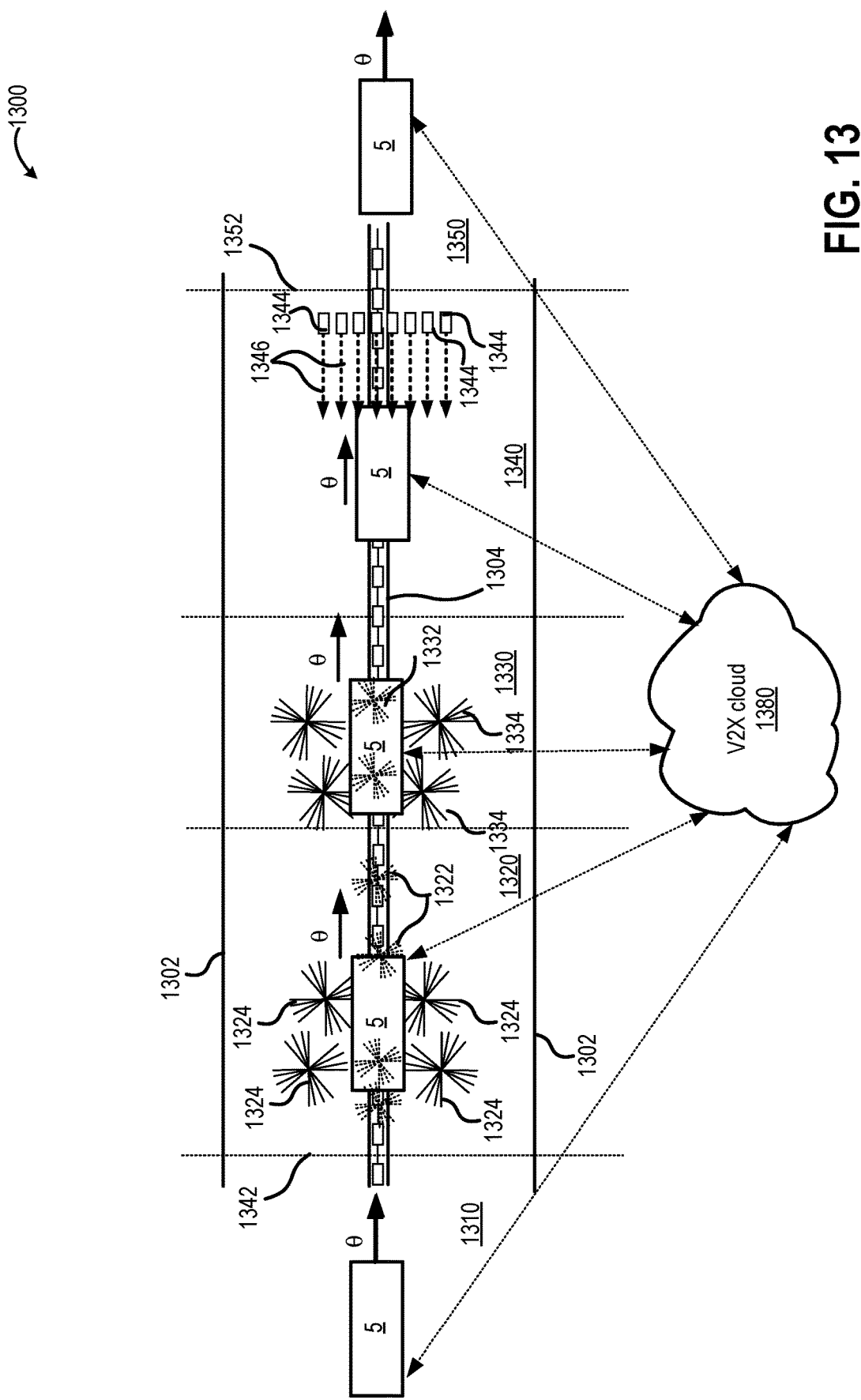
FIG. 13 shows an example schematic of a vehicle wash system for the vehicle system of FIG. 1.

The following description relates to systems and methods for operating an engine system of a vehicle, such as the engine system of FIG. 1. In particular, the systems and methods herein relate to determining a barometric pressure (BP) and a vehicle speed for a vehicle system such as the vehicle system shown in FIG. 1. The BP and vehicle speed are correlated by way of a model as illustrated by the data tables and plots of FIGS. 2 and 3. The methods of determining the BP and vehicle speed during various vehicle system operating conditions are shown in FIGS. 4-11. In one embodiment, the methods may be utilized to aid in determining a wind direction, as illustrated in FIG. 12. In another embodiment, the methods may be utilized to aid in determining completion of a vehicle wash, as illustrated in FIG. 13. Furthermore, in some embodiments, the determined BP and vehicle speed can be utilized for executing additional vehicle functions.

Turning now to the figures, FIG. 1 depicts an example embodiment of a cylinder 14 of an internal combustion engine 10, which may be included in a vehicle system 5, hereinafter also described as vehicle 5. Engine 10 may be controlled at least partially by a control system, including a controller 12, and by input from a vehicle operator 130 via an input device 132. In this example, input device 132 includes an accelerator pedal and a pedal position sensor 134 for generating a proportional pedal position signal PP. Cylinder (herein, also "combustion chamber") 14 of engine 10 may include combustion chamber walls 136 with a piston 138 positioned therein. Piston 138 may be coupled to a crankshaft 140 so that reciprocating motion of the piston is translated into rotational motion of the crankshaft. Crankshaft 140 may be coupled to at least one drive wheel 55 of the passenger vehicle via a transmission 54, as described further below. Further, a starter motor (not shown) may be coupled to crankshaft 140 via a flywheel to enable a starting operation of engine 10.

In some examples, vehicle 5 may be a hybrid vehicle with multiple sources of torque available to one or more vehicle wheels 55. In other examples, vehicle 5 is a conventional vehicle with only an engine or an electric vehicle with only an electric machine(s). In the example shown, vehicle 5 includes engine 10 and an electric machine 52. Electric machine 52 may be a motor or a motor/generator. Crankshaft 140 of engine 10 and electric machine 52 are connected via transmission 54 to vehicle wheels 55 when one or more clutches 56 are engaged. In the depicted example, a first clutch 56 is provided between crankshaft 140 and electric machine 52, and a second clutch 56 is provided between electric machine 52 and transmission 54. Controller 12 may send a signal to an actuator of each clutch 56 to engage or disengage the clutch, so as to connect or disconnect crankshaft 140 from electric machine 52 and the components connected thereto, and/or connect or disconnect electric machine 52 from transmission 54 and the components connected thereto. Transmission 54 may be a gearbox, a planetary gear system, or another type of transmission. The powertrain may be configured in various manners including as a parallel, a series, or a series-parallel hybrid vehicle.

Electric machine 52 receives electrical power from a traction battery 58 to provide torque to vehicle wheels 55. Electric machine 52 may also be operated as a generator to provide electrical power to charge battery 58, for example, during a braking operation. One or more of the vehicle wheels may have a wheel speed sensor 57 mounted thereto for determining a wheel rotational speed (e.g., a number of revolutions over time) and transmitting the detected value to controller 12. Utilizing the wheel rotational speed(s), the controller 12 may compute and output a vehicle speed at an instrument panel 196.

Cylinder 14 of engine 10 can receive intake air via a series of intake air passages 142, 144, and 146. Intake air passage 146 can communicate with other cylinders of engine 10 in addition to cylinder 14. In some examples, one or more of the intake passages may include a boosting device, such as a turbocharger or a supercharger. For example, FIG. 1 shows engine 10 configured with a turbocharger, including a compressor 174 arranged between intake passages 142 and 144 and an exhaust turbine 176 arranged along an exhaust passage 148. Compressor 174 may be at least partially powered by exhaust turbine 176 via a shaft 180 when the boosting device is configured as a turbocharger. However, in other examples, such as when engine 10 is provided with a supercharger, compressor 174 may be powered by mechanical input from a motor or the engine and exhaust turbine 176 may be optionally omitted.

A throttle 162 including a throttle plate 164 may be provided in the engine intake passages for varying the flow rate and/or pressure of intake air provided to the engine cylinders. For example, throttle 162 may be positioned downstream of compressor 174, as shown in FIG. 1, or may be alternatively provided upstream of compressor 174.

Exhaust passage 148 can receive exhaust gases from other cylinders of engine 10 in addition to cylinder 14. An exhaust gas sensor 128 is shown coupled to exhaust passage 148 upstream of an emission control device 178. Exhaust gas sensor 128 may be selected from among various suitable sensors for providing an indication of exhaust gas air/fuel ratio (AFR), such as a linear oxygen sensor or UEGO (universal or wide-range exhaust gas oxygen), a two-state oxygen sensor or EGO (as depicted), a HEGO (heated EGO), a NOx, a HC, or a CO sensor, for example. Emission control device 178 may include one or more of a three-way catalyst (TWC), a NOx trap, a selective catalyst reduction (SCR) catalyst, a diesel particulate filter (DPF), various other emission control devices, or combinations thereof.

Each cylinder of engine 10 may include one or more intake valves and one or more exhaust valves. For example, cylinder 14 is shown including at least one intake poppet valve 150 and at least one exhaust poppet valve 156 located at an upper region of cylinder 14. In some examples, each cylinder of engine 10, including cylinder 14, may include at least two intake poppet valves and at least two exhaust poppet valves located at an upper region of the cylinder. Intake valve 150 may be controlled by controller 12 via an actuator 152. Similarly, exhaust valve 156 may be controlled by controller 12 via an actuator 154. The positions of intake valve 150 and exhaust valve 156 may be determined by respective valve position sensors (not shown).

During some conditions, controller 12 may vary the signals provided to actuators 152 and 154 to control the opening and closing of the respective intake and exhaust valves. The valve actuators may be of an electric valve actuation type, a cam actuation type, or a combination thereof. The intake and exhaust valve timing may be controlled concurrently, or any of a possibility of variable intake cam timing, variable exhaust cam timing, dual independent variable cam timing, or fixed cam timing may be used. Each cam actuation system may include one or more cams and may utilize one or more of cam profile switching (CPS), variable cam timing (VCT), variable valve timing (VVT), and/or variable valve lift (VVL) systems that may be operated by controller 12 to vary valve operation. For example, cylinder 14 may alternatively include an intake valve controlled via electric valve actuation and an exhaust valve controlled via cam actuation, including CPS and/or VCT. In other examples, the intake and exhaust valves may be controlled by a common valve actuator (or actuation system) or a variable valve timing actuator (or actuation system).

Cylinder 14 can have a compression ratio, which is a ratio of volumes when piston 138 is at bottom dead center (BDC) to top dead center (TDC). In one example, the compression ratio is in the range of 9:1 to 10:1. However, in some examples where different fuels are used, the compression ratio may be increased. This may happen, for example, when higher octane fuels or fuels with higher latent enthalpy of vaporization are used. The compression ratio may also be increased if direct injection is used due to its effect on engine knock.

In some examples, each cylinder of engine 10 may include a spark plug 192 for initiating combustion. An ignition system 190 can provide an ignition spark to combustion chamber 14 via spark plug 192 in response to a spark advance signal SA from controller 12, under select operating modes. A timing of signal SA may be adjusted based on engine operating conditions and driver torque demand. For example, spark may be provided at maximum brake torque (MBT) timing to maximize engine power and efficiency. Controller 12 may input engine operating conditions, including engine speed, engine load, and exhaust gas AFR, into a look-up table and output the corresponding MBT timing for the input engine operating conditions.

In some examples, each cylinder of engine 10 may be configured with one or more fuel injectors for providing fuel thereto. As a non-limiting example, cylinder 14 is shown including a fuel injector 166. Fuel injector 166 may be configured to deliver fuel received from a fuel system 8. Fuel system 8 may include one or more fuel tanks, fuel pumps, and fuel rails. Fuel injector 166 is shown coupled directly to cylinder 14 for injecting fuel directly therein in proportion to the pulse width of a signal FPW received from controller 12 via an electronic driver 168. In this manner, fuel injector 166 provides what is known as direct injection (hereafter also referred to as "DI") of fuel into cylinder 14. While FIG. 1 shows fuel injector 166 positioned to one side of cylinder 14, fuel injector 166 may alternatively be located overhead of the piston, such as near the position of spark plug 192. Such a position may increase mixing and combustion when operating the engine with an alcohol-based fuel due to the lower volatility of some alcohol-based fuels. Alternatively, the injector may be located overhead and near the intake valve to increase mixing. Fuel may be delivered to fuel injector 166 from a fuel tank of fuel system 8 via a high pressure fuel pump and a fuel rail. Further, the fuel tank may have a pressure transducer providing a signal to controller 12.

In an alternate example, fuel injector 166 may be arranged in intake passage 146 rather than coupled directly to cylinder 14 in a configuration that provides what is known as port injection of fuel (hereafter also referred to as "PFI") into an intake port upstream of cylinder 14. In yet other examples, cylinder 14 may include multiple injectors, which may be configured as direct fuel injectors, port fuel injectors, or a combination thereof. As such, it should be appreciated that the fuel systems described herein should not be limited by the particular fuel injector configurations described herein by way of example.

Fuel injector 166 may be configured to receive different fuels from fuel system 8 in varying relative amounts as a fuel mixture and further configured to inject this fuel mixture directly into cylinder. Further, fuel may be delivered to cylinder 14 during different strokes of a single cycle of the cylinder. For example, directly injected fuel may be delivered at least partially during a previous exhaust stroke, during an intake stroke, and/or during a compression stroke. As such, for a single combustion event, one or multiple injections of fuel may be performed per cycle. The multiple injections may be performed during the compression stroke, intake stroke, or any appropriate combination thereof in what is referred to as split fuel injection.

Fuel tanks in fuel system 8 may hold fuels of different fuel types, such as fuels with different fuel qualities and different fuel compositions. The differences may include different alcohol content, different water content, different octane, different heats of vaporization, different fuel blends, and/or combinations thereof, etc. One example of fuels with different heats of vaporization includes gasoline as a first fuel type with a lower heat of vaporization and ethanol as a second fuel type with a greater heat of vaporization. In another example, the engine may use gasoline as a first fuel type and an alcohol-containing fuel blend, such as E85 (which is approximately 85% ethanol and 15% gasoline) or M85 (which is approximately 85% methanol and 15% gasoline), as a second fuel type. Other feasible substances include water, methanol, a mixture of alcohol and water, a mixture of water and methanol, a mixture of alcohols, etc. In still another example, both fuels may be alcohol blends with varying alcohol compositions, wherein the first fuel type may be a gasoline alcohol blend with a lower concentration of alcohol, such as E10 (which is approximately 10% ethanol), while the second fuel type may be a gasoline alcohol blend with a greater concentration of alcohol, such as E85 (which is approximately 85% ethanol). Additionally, the first and second fuels may also differ in other fuel qualities, such as a difference in temperature, viscosity, octane number, etc. Moreover, fuel characteristics of one or both fuel tanks may vary frequently, for example, due to day to day variations in tank refilling.

The vehicle instrument panel 196 may include indicator light(s) and/or a text-based display in which messages are displayed to an operator. The vehicle instrument panel 196 may also include various input portions for receiving an operator input, such as buttons, touch screens, voice input/recognition, etc. For example, the vehicle instrument panel 196 may include a refueling button 197 which may be manually actuated or pressed by a vehicle operator to initiate refueling. For example, as described in more detail below, in response to the vehicle operator actuating refueling button 197, a fuel tank in the vehicle may be depressurized so that refueling may be performed. In an alternative embodiment, the vehicle instrument panel 196 may communicate audio messages to the operator without display. In another example, the vehicle instrument panel may also display an SCR deactivation extent. The SCR deactivation extent may be available to a vehicle operator and/or service technician as a data plot showing historical and current data, or as a displayed numerical representation indicating the current % life (100−% SCR deactivation extent) of the SCR catalyst remaining.

Controller 12 is shown in FIG. 1 as a microcomputer, including a microprocessor unit 106, input/output ports 108, an electronic storage medium for executable programs (e.g., executable instructions) and calibration values shown as non-transitory read-only memory chip 110 in this particular example, random access memory 112, keep alive memory 114, and a data bus. Controller 12 receives signals from the various sensors of FIG. 1 and employs the various actuators of FIG. 1 to adjust engine operation based on the received signals and instructions stored on a memory of the controller. Controller 12 may receive various signals from sensors coupled to engine 10, including signals previously discussed and additionally including a measurement of inducted mass air flow (MAF) from a mass air flow sensor 122; an engine coolant temperature (ECT) from a temperature sensor 116 coupled to a cooling sleeve 118; an exhaust gas temperature from a temperature sensor 158 coupled to exhaust passage 148; a profile ignition pickup signal (PIP) from a Hall effect sensor 120 (or other type) coupled to crankshaft 140; throttle position (TP) from a throttle position sensor; signal EGO from exhaust gas sensor 128, which may be used by controller 12 to determine the AFR of the exhaust gas; and an absolute manifold pressure signal (MAP) from a MAP sensor 124. During various vehicle operating conditions, controller 12 may infer barometric pressure from the manifold pressure signal MAP. In one example, the controller 12 may equate the barometric pressure with the intake manifold pressure during engine off conditions. In another example, the controller 12 may determine the BP by adding a threshold pressure drop across the engine intake, based on mass air flow. In other examples, correlations between throttle position, engine mass-airflow, and barometric pressure can be utilized in cooperation with engine breathing data. An engine speed signal, RPM, may be generated by controller 12 from signal PIP. The manifold pressure signal MAP from MAP sensor 124 may be used to provide an indication of vacuum or pressure in the intake manifold. Controller 12 may infer an engine temperature based on the engine coolant temperature and infer a temperature of emission control device 178 based on the signal received from temperature sensor 158.

Vehicle 5 may include an additional sensors 90 outputting signals to the controller 12, including a vehicle speed sensor 92, a BP sensor 94, an altitude sensor 96, and a direction sensor 98. Controller 12 may determine vehicle speed and/or barometric pressure from one or more of vehicle speed sensor 92, BP sensor 94, altitude sensor 96, and direction sensor 98. As describe further herein, the method of determining the vehicle speed and/or BP from sensor information may depend on vehicle operating conditions. In one example, during vehicle operating conditions where the BP can be reliably determined, for example, when BP sensor is functional and/or BP inference from manifold pressure signal MAP is reliable and accurate, controller 12 may determine BP from BP sensor 94 and/or manifold pressure signal MAP, respectively. In contrast, during vehicle operating conditions where the BP sensor is degraded and/or an accuracy of BP inference from manifold pressure signal MAP is lower, controller 12 may estimate BP utilizing additional sensors and/or methods, such as such as altitude sensor 96 and the methods described herein. Similarly, during vehicle operating conditions when controller 12 is unable to determine vehicle speed accurately from wheel speed sensors 55 alone, controller 12 may utilize data from one or more additional sensors and/or methods, such as BP sensor 94, altitude sensor 96, direction sensor 98, and the methods described herein.

Vehicle speed sensor 92 may include one or more sensors which receive and transmit information to the controller 12 in conjunction with other vehicle sensors to determine vehicle speed. In other cases, vehicle speed sensor 92 may include one or more sensors that can determine vehicle speed independently of other vehicle sensors. In one example, vehicle speed sensor 92 may include a GPS device. GPS data from the GPS device may be transmitted to the controller 12, which may compute a vehicle speed from the GPS data alone or along with the signals from other vehicle sensors, such as wheel speed sensors 57. In another example, vehicle speed sensor 92 may include an on-board camera and radar system that may recognize traffic sign boards, such as a radar speed sign, through an image recognition module residing on board controller 12. BP sensor 94 may include one or more sensors which receive and transmit information to the controller 12 in conjunction with other vehicle sensors to determine BP. In other cases, BP sensor 94 may include one or more sensors that can determine BP independently of other vehicle sensors. In one example, BP sensor 94 may include a barometric pressure transducer for directly measuring the barometric pressure. The barometric pressure transducer may be mounted at the vehicle 5 for example, along the firewall or along the fender in the engine bay.

Altitude sensor 96 may include one or more sensors which receive and transmit information to the controller 12 in conjunction with other vehicle sensors to determine a vehicle altitude. In other cases, altitude sensor 96 may include one or more sensors that can determine the vehicle altitude independently of other vehicle sensors. In one example, altitude sensor 96 may include a barometric pressure transducer, which may also serve to measure BP (e.g. BP sensor 94). Altitude may be computed from the static barometric pressure (e.g., when the vehicle is stationary). In another example, altitude sensor may include a GPS device, which can determine altitude from communication with multiple satellites. Direction sensor 98 may include one or more sensors which receive and transmit information to the controller 12 in conjunction with other vehicle sensors to determine a vehicle direction (e.g., orientation). In other cases, direction sensor 98 may include one or more sensors that can determine the vehicle direction independently of other vehicle sensors. Direction sensor 98 may include a compass, such as a digital compass. In another example, direction sensor 98 may include a GPS device. In one example, the controller 12 may determine a wind direction based at least partly on signals received from the direction sensor 98.

As described above, FIG. 1 shows only one cylinder of a multi-cylinder engine. As such, each cylinder may similarly include its own set of intake/exhaust valves, fuel injector(s), spark plug, etc. It will be appreciated that engine 10 may include any suitable number of cylinders, including 2, 3, 4, 5, 6, 8, 10, 12, or more cylinders. Further, each of these cylinders can include some or all of the various components described and depicted by FIG. 1 with reference to cylinder 14.

Figure 2:
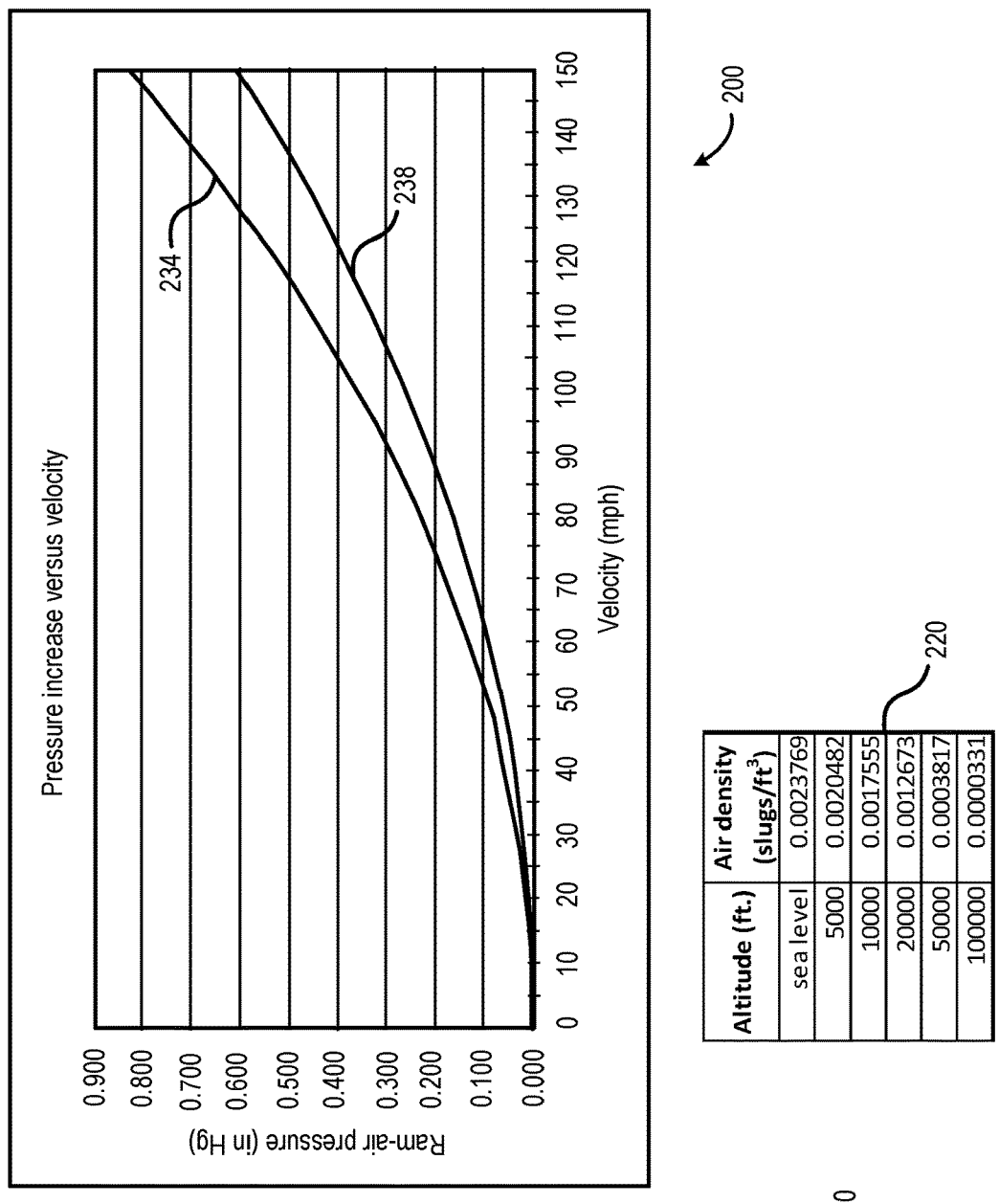
FIGS. 2 and 3 show various data tables and plots of an example model correlating measured barometric pressure with vehicle speed for a system such as the example vehicle system of FIG. 1.

Turning now to FIG. 2, it illustrates a plot 200 and data tables 210 and 220 for a model correlating measured barometric pressure with vehicle speed. Data table 210 lists vehicle speed data, Vs (mph), and measured ram-air pressure at two different altitudes, sea level and 10,000 ft. The measured ram-air pressure may be determined by subtracting a static barometric pressure, $BP_{static}$, from a measured barometric pressure, $BP_{meas}$. $BP_{meas}$ may be determined from a barometric pressure sensor 94 on board the vehicle 5 and/or an inferred barometric pressure from one or more sensors 90 and/or other sensor signals (e.g., MAP) received by the controller 12. The barometric pressure, BP, and the ram-air pressure, can vary with the air density (slugs/ft$^3$) and the speed of the vehicle, Vs (ft/s), as shown in equation (1):

$$BP_{meas} - BP_{static} = P_{ram\text{-}air} [\text{inHg}] = 0.5*(\text{air density})*(Vs)^2*(0.01414) \quad (1)$$

As shown by the plotted trend line corresponding to $P_{ram\text{-}air}$ at sea level 234 and $P_{ram\text{-}air}$ at 10,000 feet, $P_{ram\text{-}air}$ increases with increasing vehicle speed, and decreases with increasing altitude. Air density decreases with increasing altitude, as shown in data table 220; thus, $P_{ram\text{-}air}$ (and BP) is lower when the vehicle is at a higher altitude. The vehicle speed (e.g., the velocity of the vehicle relative to the air impinging on the vehicle) influences the measured barometric pressure through ram-air pressure, which is the pressure exerted on the vehicle moving through the air, caused by relative bulk motion of the air rather than random thermal motion. When the vehicle speed increases, the ram-air pressure exerted on the vehicle is higher, which increases $BP_{meas}$.

Figure 3:
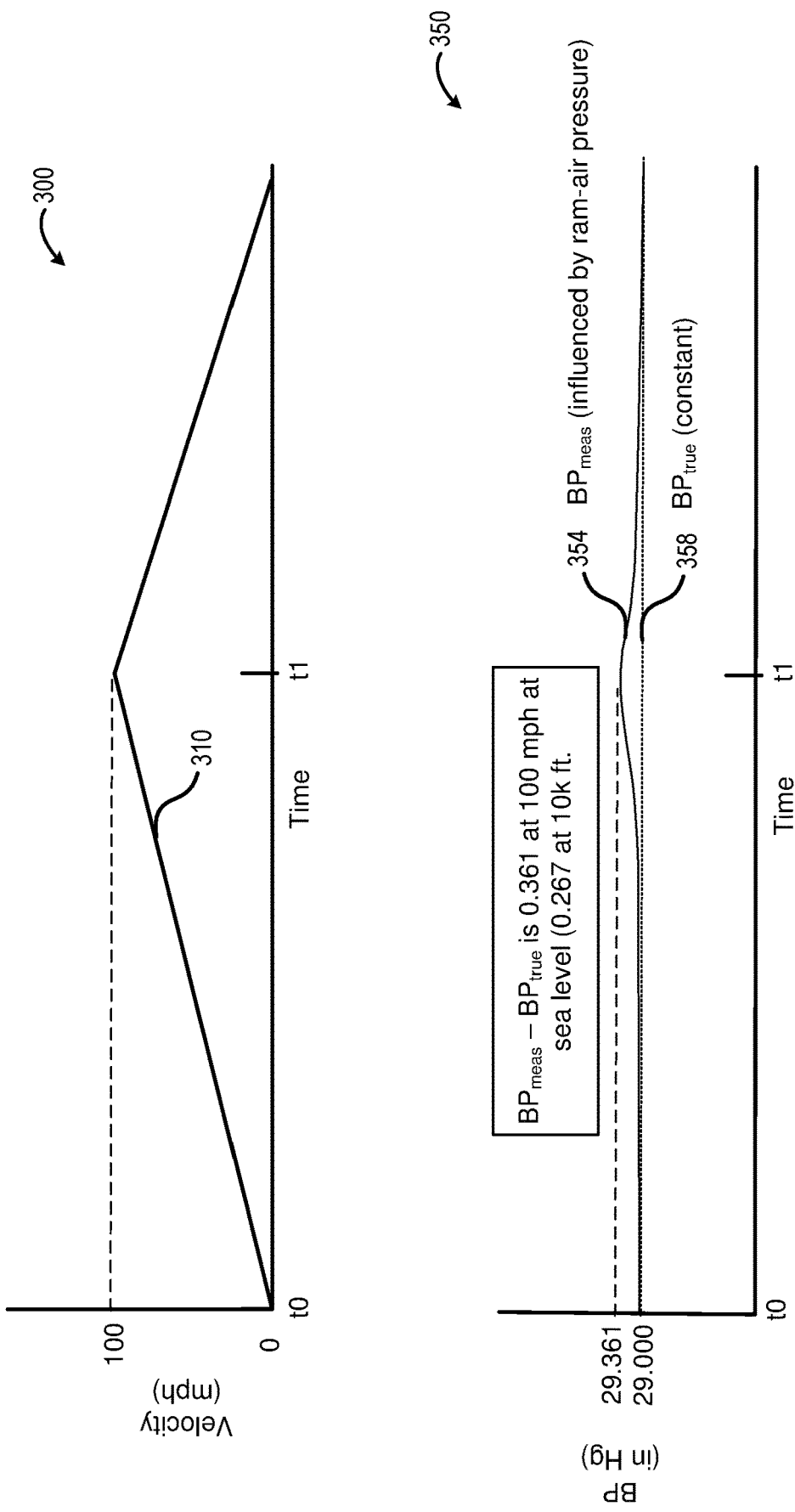
Figure 4:
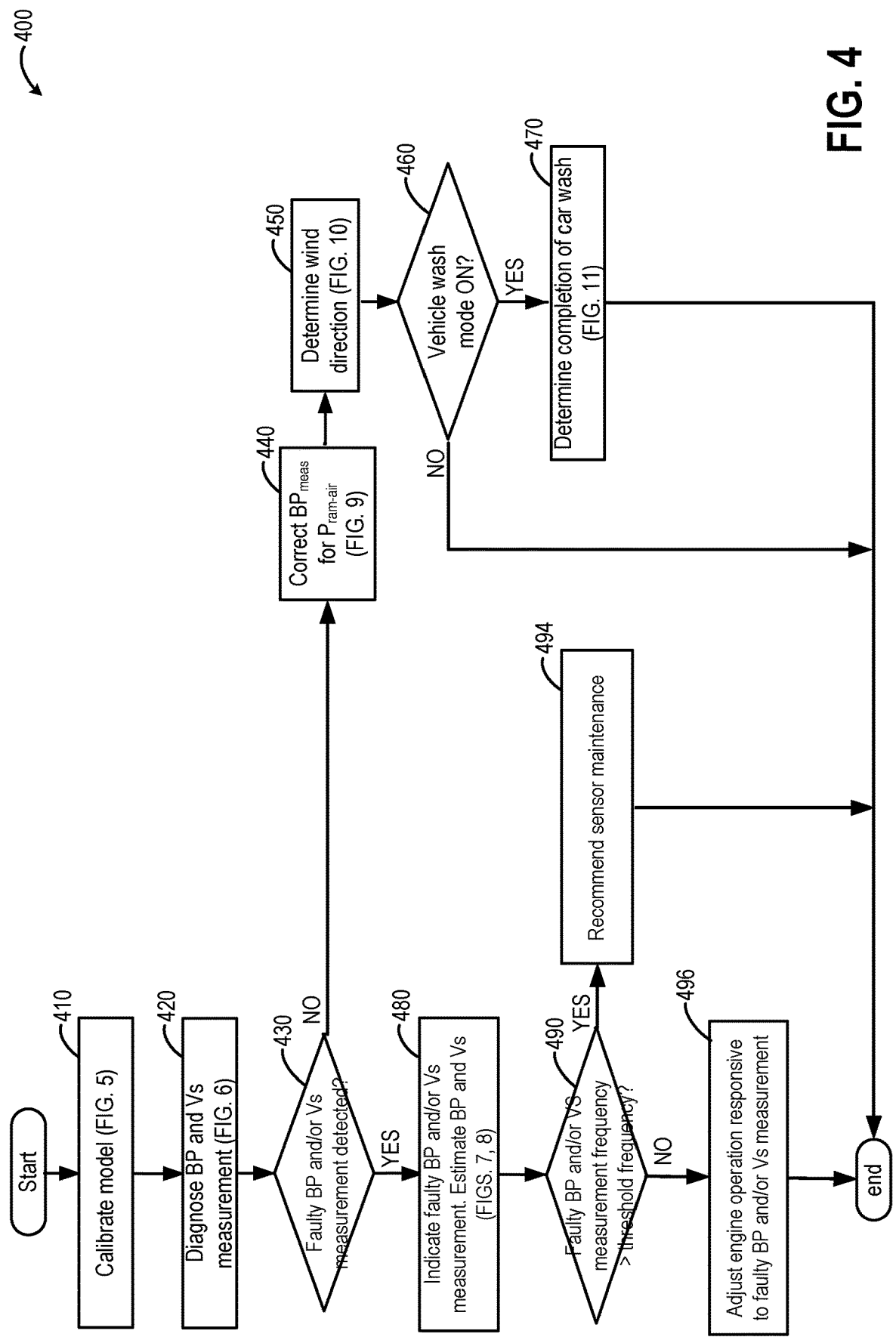
FIGS. 4-11 show flow charts for example methods of determining barometric pressure and vehicle speed for a system such as the example vehicle system of FIG. 1.

Turning now to FIG. 3, it illustrates plot 300 of the vehicle speed (Vs) with time and a plot 350 of the true barometric pressure 358, $BP_{true}$ and $BP_{meas}$ 354 with time, at sea level. Both plots 300 and 350 have the same time scale. $BP_{true}$ may be determined by measuring the static barometric pressure when Vs=0 (e.g., ram-air pressure is negligible). At time t0, Vs is 0 and $BP_{true} = BP_{meas}$ (29.000 inHg) since the ram-air pressure is negligible. As the velocity is increased from 0 mph at time t0 to 100 mph at time t1, the $BP_{meas}$ increasingly deviates above $BP_{true}$. The true barometric pressure 358 at sea level remains constant with vehicle speed, while ram-air pressure effects can change $BP_{meas}$; at time t1, $BP_{meas}$ is 29.361 inHg while $BP_{true}$ is 29.000 inHg. In other words, the ram-air pressure exerted on the vehicle when Vs is 100 mph is 0.361 inHg, as indicated by data row 214 of data table 210. As described further with reference to FIG. 5, the model may refer to the various data tables and plots of FIGS. 2 and 3, as well as equation (1), for correlating the measured barometric pressure measured and/or inferred on board the vehicle as a function of the vehicle speed and altitude. In other words, the model can determine how the apparent (e.g., measured) vehicle barometric pressure changes with altitude and ram-air pressure effects caused by changing vehicle speeds. Furthermore, the data tables and plots of FIGS. 2 and 3 may be extended for altitudes below 0 feet and beyond 10,000 feet, and at vehicle speeds above 100 mph. In addition, the model resolution may be increased or decreased relative to the data tables and plots of FIGS. 2 and 3.

Turning now to FIGS. 4-11, they illustrate flow charts for methods 400, 500, 600, 700, 800, 900, 1000, and 1100 of operating a vehicle 5. Instructions for carrying out method 400 and the rest of the methods included herein may be executed by a controller 12 based on instructions stored on a memory of the controller 12 and in conjunction with signals received from sensors of the engine system 10, such as the sensors described above with reference to FIG. 1. The controller 12 may employ engine actuators of the engine system 10 to adjust engine operation, according to the methods described below. Method 400 presents a general method for determining BP and Vs and operating vehicle 5, and begins at 410 where the controller 12 calibrates a model correlating BP and Vs (method 500 of FIG. 5). As described above with reference to FIGS. 2 and 3, the model correlating BP and Vs may determine how ram-air pressure exerted on the vehicle 5 influences $BP_{meas}$, and how BP changes with altitude. After calibrating the model at 410, method 400 continues at 420, where the controller 12 diagnoses measurement of the BP and Vs (method 600 of FIG. 6). As described further herein with reference to FIG. 6, diagnosing the BP and Vs measurement may include comparing the measured BP and the BP predicted by the model calibrated at step 410 (method 500 of FIG. 5).

Next, at 430, the controller 12 determines if a faulty or degraded BP and/or Vs measurement is detected. For the case where a faulty \ BP and/or Vs measurement is detected, method 400 continues at 480 where the controller may indicate a faulty BP and/or Vs measurement and then estimate BP and Vs. In some examples, vehicle on-board diagnostic (OBD) routines may be less reliable when an altitude increases above a higher threshold altitude (e.g., 8000 ft.); thus, responsive to indicating a faulty BP and/or Vs measurement, the controller 12 may reduce a frequency of executing one or more OBD routines. As described further herein with reference to FIGS. 7 and 8, the controller 12 may estimate BP and/or Vs by utilizing a model correlating BP with Vs through ram-air pressure and altitude effects. For the case where the estimated BP and/or Vs by controller 12 is more reliable (e.g., during conditions of roughly constant altitude and/or vehicle speed) OBD routine execution frequency may be maintained.

Next, at 490, the controller 12 determines if the faulty BP and/or Vs measurement frequency is greater than a threshold frequency. The threshold frequency may include a threshold number of occurrences. In one example, the threshold frequency may include a 50% frequency of faulty BP and/or Vs indications over four measurement determinations. For the case where the faulty BP and/or Vs measurement frequency exceeds the threshold frequency (or threshold occurrence), method 400 continues at 494 where the controller 12 recommends sensor maintenance to the vehicle operator. At 496, the controller 12 may adjust vehicle operation responsive to a faulty BP and/or Vs measurement frequency exceeding the threshold frequency. For example, the controller 12 may reduce an execution frequency of one or more OBD routines. Furthermore, during vehicle operating conditions when an excess load results in pre-ignition of the engine, the controller 12 may reduce a nominal upper threshold load of the engine by an amount commensurate with the load estimation error from the BP inaccuracy. Returning to 490, for the case where the faulty BP and/or Vs measurement frequency does not exceed the threshold frequency (or threshold occurrence), and after 496, method 400 ends. Indicating a faulty BP and/or Vs at 480 and recommending sensor maintenance 494, may be executed by controller 12 by displaying a visual and/or audio indication at instrument panel 196.

Returning to 430 for the case where a faulty BP and/or Vs measurement is not detected, method 400 continues at 440 where $BP_{meas}$ is corrected for the ram-air pressure, $P_{ram-air}$. As described further herein with reference to FIG. 9, correcting $BP_{meas}$ for $P_{ram-air}$ may include determining $P_{ram-air}$ from the model calibrated at 410, and subtracting $P_{ram-air}$ from $BP_{meas}$. Next, method 400 continues at 450 where the controller 12 determines a wind direction. As described herein with reference to FIG. 10, the controller 12 may determine the wind direction by comparing a change in $BP_{meas}$ with a change in ram-air pressure, as predicted by the model calibrated at 410. Next, method 400 continues at 460 where the controller 12 determines if the vehicle wash mode is ON, indicating that the vehicle is traveling through an automatic vehicle wash system. In one example, indicating the vehicle wash mode is ON may be responsive to operator input such as depressing a vehicle wash mode ON button. In another example, indicating the vehicle wash mode is ON may be responsive to a vehicle-to-everything (V2X) cloud communication (e.g. 1380 of FIG. 13) received from the vehicle wash system external to the vehicle 5. For the case where the vehicle wash mode is ON, method 400 continues at 470 where the controller 12 determines if the vehicle wash is ended. As described herein with reference to FIG. 11, the controller 12 may determine if the vehicle wash is ended based on an estimated air velocity relative to the vehicle speed decreases below a lower threshold speed after having increased above an upper threshold speed. Returning to 460 for the case where the vehicle mode is OFF, method 400 ends.

Figure 5:
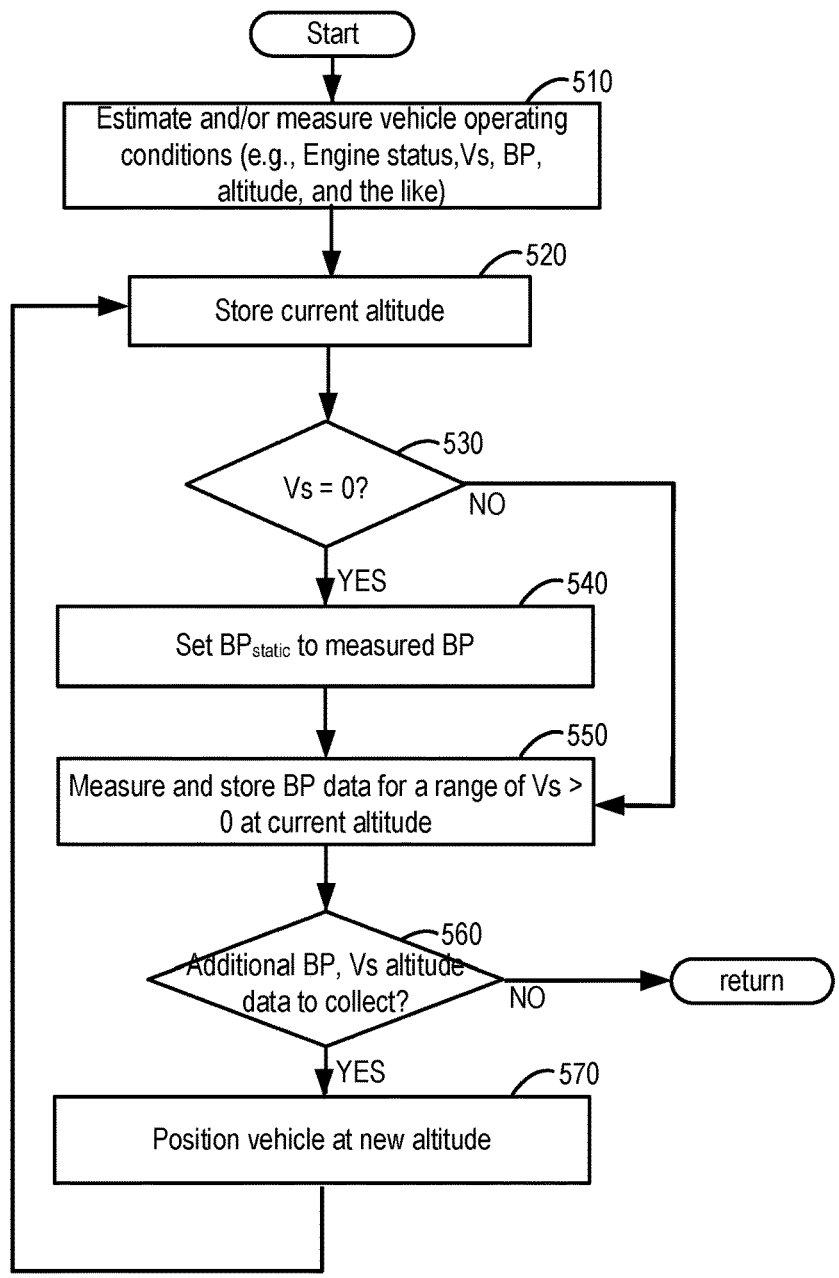

Turning now to FIG. 5, it illustrates flow chart for an example method 500 of calibrating a model correlating the measured barometric pressure at a vehicle 5 to the vehicle speed. As described above with reference to FIGS. 2 and 3, calibrating the model may include gathering barometric pressure measurements over a range of vehicle speeds over a range of altitudes. In this way, lookup data tables (e.g., data table 210) and data plots thereof may be populated with ram-air pressure data for looking up and/or interpolating (and extrapolating) and estimating apparent barometric pressure (or ram-air pressure and static barometric pressure) over a broad range of vehicle speeds and altitudes. Additionally, equation (1) in combination with altitude and air density data (e.g., Table 220) may be used to generate the data for the model and lookup table. In one example, interpolating may include linearly interpolating between pairs of data points; quadratic interpolation may be utilized in cases where higher accuracy and/or precision is desirable. Similarly, vehicle speed data may be estimated over a broad range of apparent barometric pressures and altitudes by interpolating (and extrapolating) from the data tables and plots. Calibrating the model may take place during regular vehicle operation, or may be performed in the factory after manufacture where the model preloaded into non-transitory memory of the controller 12.

Turning now to FIG. 5, it illustrates method 500 begins at 510 (from method 400 at 410), where the controller 12 estimates and/or measures various engine operating conditions such as the engine status, vehicle speed (Vs), barometric pressure ($BP_{meas}$), altitude, and the like. Measuring the barometric pressure (BP) may include determining $BP_{meas}$ by way of a BP sensor, or by inferring $BP_{meas}$ from one or more engine sensors such as the MAP sensor. Next, method 500 continues at 520 where the controller 12 stores the measured current altitude in memory. At 530, method 500 continues where the controller 12 determines if the vehicle speed is stationary (e.g., Vs=0). For the case where Vs=0, method 500 continues at 540 where the static BP, $BP_{static}$ is set to the measured BP, $BP_{meas}$.

Returning to 530 for the case where Vs is not 0, and continuing from 540, method 500 continues at 550 where the controller measures and stores BP data for a range of vehicle speeds at the current altitude. In other words, the vehicle is operated over a range of Vs from a first threshold Vs to a second threshold Vs, increasing Vs at a vehicle speed threshold interval between each measurement, to generate BP data for each column (e.g., corresponding to each altitude) of data table 210. After 550, method 500 continues at 560 where the controller 12 determines if additional BP, Vs, and altitude data is to be collected. As represented in data table 210, BP measurements may be collected over a range of Vs from a first threshold Vs to a second threshold Vs. In the example of FIG. 2, the first threshold Vs includes 0 mph, while the second threshold Vs includes 150 mph; however, in other examples, the second threshold Vs may be higher than 150 mph. In particular, the second threshold Vs may vary depending on the vehicle type; for example, the second threshold Vs may be lower for a construction vehicle, whereas the second threshold Vs may be higher for a race car. As shown in data table 210, BP measurements may be collected at each altitude at vehicle speed threshold intervals of 5 mph increments; in other examples, the resolution of the model may be lower or higher. Furthermore, the vehicle speed threshold interval may vary depending on the rate of change of the BP with vehicle speed. In other words, the vehicle speed threshold interval may be smaller when the rate of change of the BP with vehicle speed is higher, and the vehicle speed threshold interval may be larger when the rate of change of the BP with vehicle speed is lower. Further still, the vehicle speed threshold interval may be selected such that linear interpolation between successive data points may provide reliable estimates of the barometric pressure. In this way, the model may be calibrated to encompass the range of Vs and BP values expected during operation of the vehicle over a range of altitudes expected for typical vehicle operation. The range of altitudes expected for typical vehicle operation may also depend on vehicle type, and can include negative altitudes (e.g., below sea level). For the case where additional BP, Vs, and altitude data is to be collected, method 500 continues at 570 where the vehicle is positioned at a new altitude and the method continues at 520. Returning to 560 for the case where additional data is not to be collected, method 500 returns to method 400 after 410.

Figure 6:
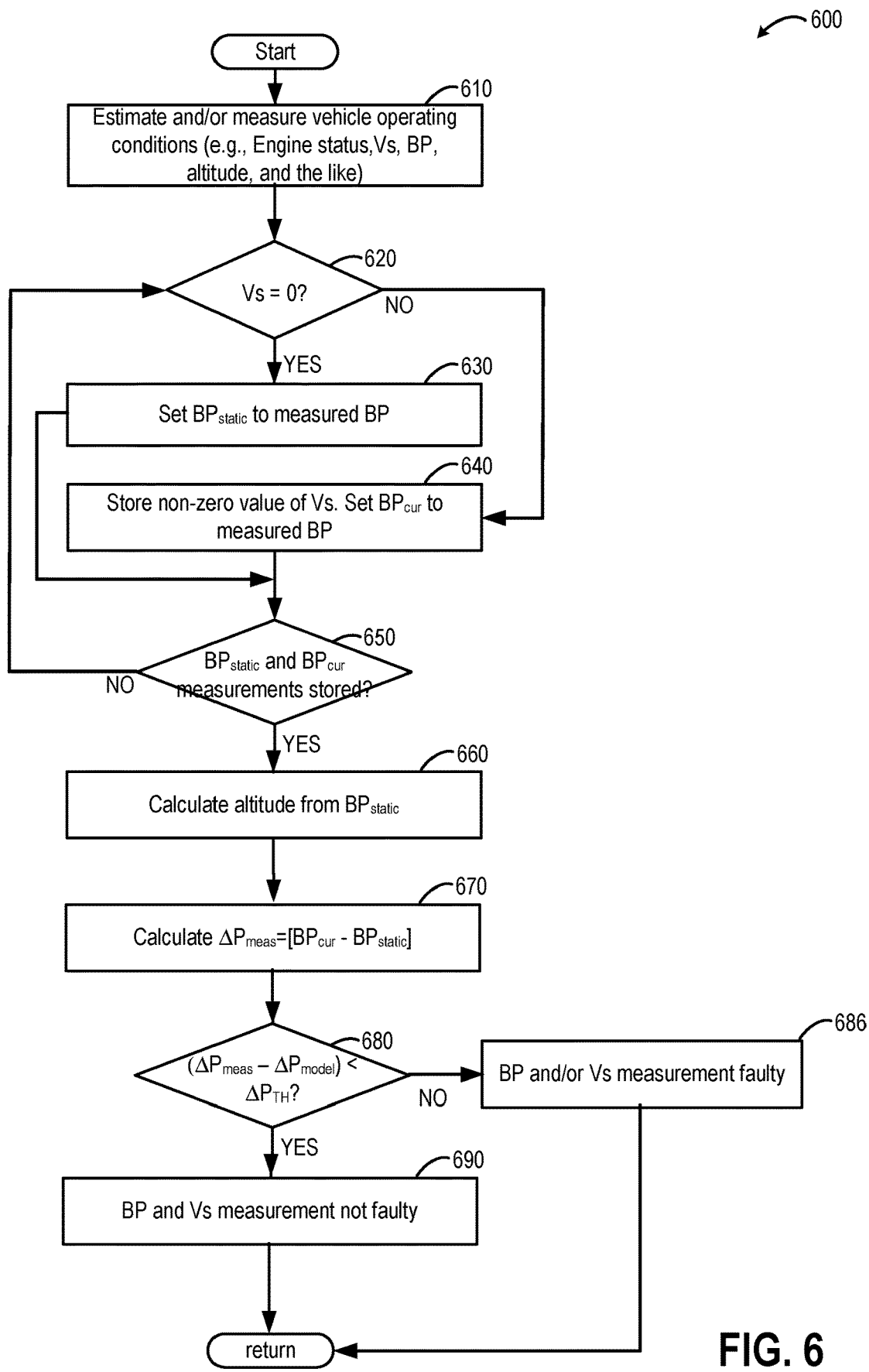

Turning now to FIG. 6, it illustrates an example method 600 of diagnosing BP and Vs measurements. Method 600 begins (after method 400 at 420) at 610, where the controller 12 estimates and/or measures various engine operating conditions such as the engine status, vehicle speed (Vs), barometric pressure ($BP_{meas}$), altitude, and the like. Method 600 continues at 620 (BP meas), where the controller 12 determines if the vehicle speed is 0. For the case where Vs=0 at 620, method 600 continues at 630 where the controller 12 stores the static barometric pressure by setting $BP_{static}$ to $BP_{meas}$. Returning to 620, the case where Vs is not 0, method 600 continues at 640 where the controller stores Vs by setting the current BP, $BP_{cur}$, to $BP_{meas}$. In some examples, $BP_{cur}$ and $BP_{static}$ are measured over a constant altitude; said another way, a change in vehicle altitude when $BP_{cur}$ is measured relative to when $BP_{static}$ is measured may be less than a threshold altitude change, $\Delta altitude_{TH}$. $\Delta altitude_{TH}$ may include a change in altitude below which $BP_{static}$ remains roughly constant. For the case where the change in vehicle altitude when $BP_{cur}$ is measured relative to when $BP_{static}$ is measured is greater than $\Delta altitude_{TH}$, utilizing the model to estimate Vs and BP may include interpolating between data columns and data rows of table 210; in other words, when the vehicle altitude changes (more than $\Delta altitude_{TH}$), the pressure-velocity loci of FIG. 2 change from lines to curved bands.

Following 630 and 640, method 600 continues at 650 where the controller 12 determines if both measurements of $BP_{static}$ and $BP_{cur}$ have been stored in memory. For the case where both measurements of $BP_{static}$ and $BP_{cur}$ have not been stored in memory, method 600 returns to 620. For the case where both measurements of $BP_{static}$ and $BP_{cur}$ have been stored in memory, method 600 continues at 660 where the controller 12 calculates the current altitude based on the stored value of $BP_{static}$. The altitude is calculated utilizing equation (2):

$$P\_altitude \text{ (inHg)} = 29.92 - (\text{altitude}/1000) \quad (2)$$

In equation (2), the pressure at altitude, P_altitude (e.g., $BP_{static}$), is measured in inches of mercury (inHg) and the altitude is measured in feet. From equation (2), the altitude can be calculated as shown in equation (3):

$$\text{Altitude} = (29.92 - P\_altitude) * 1000 \quad (3)$$

Because $BP_{static}$ is measured when the vehicle speed is 0, the ram-air pressure is negligible.

Next, method 600 continues at 670 where controller 12 calculates a measured difference, $\Delta P_{meas}$, between $BP_{cur}$ and $BP_{static}$. In other words, $\Delta P_{meas}$ represents an apparent or measured ram-air pressure. At 680, the controller 12 computes a predicted ram-air pressure, $\Delta P_{model}$, and determines if a difference between $\Delta P_{meas}$ and $\Delta P_{model}$ is less than a threshold pressure difference, $\Delta P_{TH}$. Controller 12 determines $\Delta P_{model}$ from the calibrated model based on a vehicle speed and altitude at which cur is BP measured. In one example, referring to data row 214, $\Delta P_{model}$ for Vs=100 mph at sea level would be 0.361 inHg. In one example $\Delta P_{TH}$ may include 0.01 inHg. In another example, $\Delta P_{TH}$ may vary depending on the altitude and vehicle speed. For instance, during conditions where a rate of change of $P_{ram-air}$ with vehicle speed is higher, $\Delta P_{TH}$ may be higher. Similarly, $\Delta P_{TH}$ may be lower when the altitude is higher since a rate of change of $P_{ram-air}$ with vehicle speed is lower.

For the case where $(\Delta P_{meas} - \Delta P_{model}) < \Delta P_{TH}$, method 600 continues at 690 where the controller 12 determines that the BP and Vs measurement is not faulty because the model predictions for BP and $BP_{meas}$ at the given Vs and altitude are within $\Delta P_{TH}$. In other words, the measured BP and Vs are in sufficient agreement with the model. For the case where $(\Delta P_{meas} - \Delta P_{model}) > \Delta P_{TH}$, method 600 continues at 686 where the controller 12 determines that BP and/or Vs measurements are faulty because the model predictions for BP and $BP_{meas}$ at the given Vs and altitude are not within ΔP$_{TH}$. In other words, the measured BP and Vs are inconsistent with the expected values based on model predictions. In further examples, supplemental diagnostics may be utilized to determine if BP and/or Vs alone are faulty. For example, radar return data may be utilized for determining Vs, and BP measurements over a changing altitude may be utilized to determine BP. After 686 and 690, method 600 returns to method 400 after 420.

Figure 7:
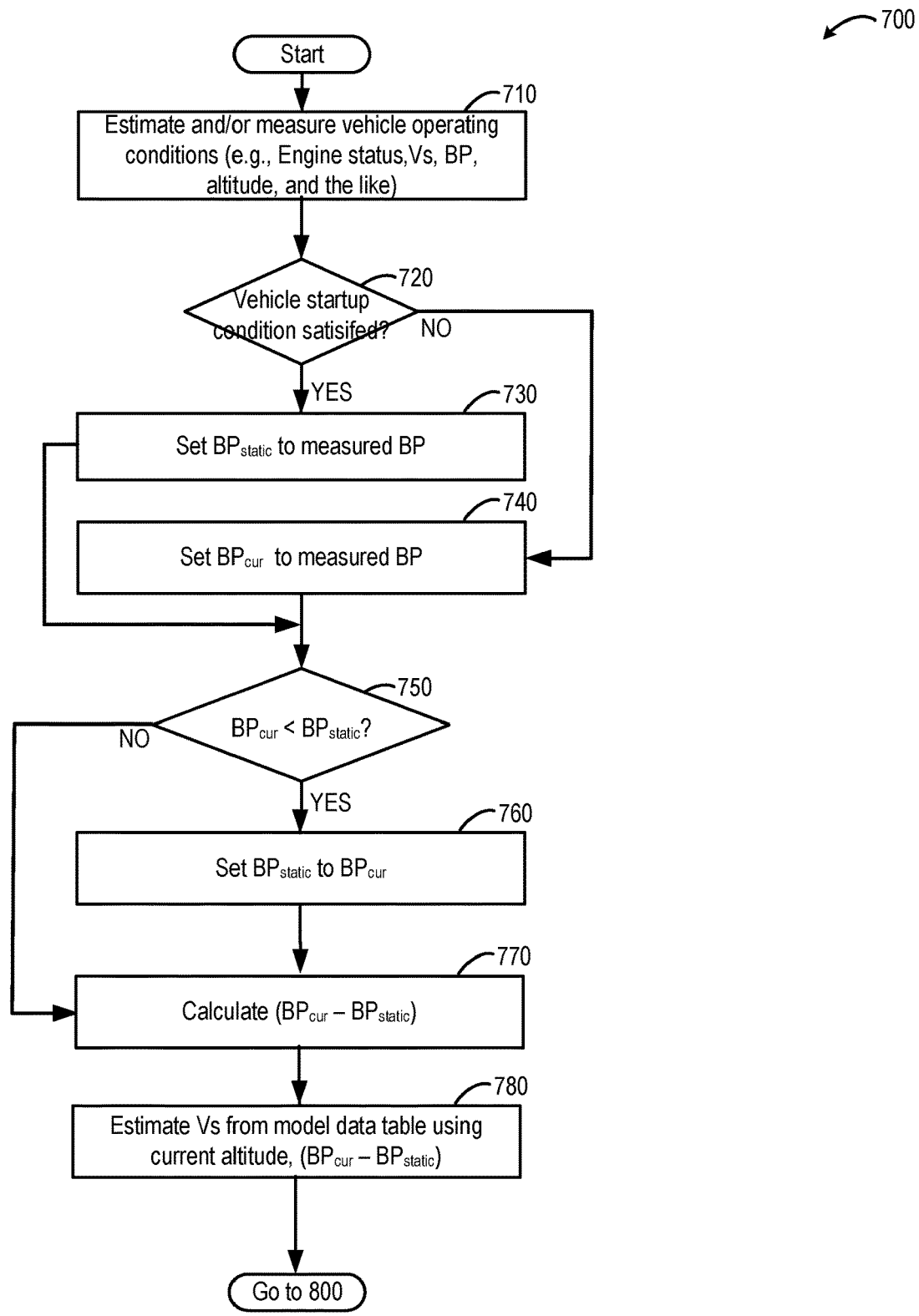

Turning now to FIG. 7, it illustrates a flow chart for an example method 700 of estimating Vs. In one example, method 700 is executed in response to diagnosing a faulty or degraded BP and/or Vs measurement at 480 of method 400 (after executing method 600 of FIG. 6). Method 700 begins at 710, where the controller 12 estimates and/or measures various engine operating conditions such as the engine status, vehicle speed (Vs), barometric pressure (BP$_{meas}$), altitude, and the like. Method 700 continues at 720 where the controller 12 determines if the vehicle startup condition is satisfied. As non-limiting examples, the vehicle startup condition may be satisfied in response to one or more of a key ON ignition condition, passing an anti-theft detection test, and depressing the brake pedal while the ignition is switched ON. For the case where the vehicle startup condition is satisfied, method 700 proceeds to 730 where the controller 12 sets BP$_{static}$=BP$_{meas}$. Returning to 720, for the case where the vehicle startup condition is not satisfied, method 700 continues at 740 where the current BP, BP$_{cur}$ is set to BP$_{meas}$. Following 730 and 740, method 700 continues at 750 where the controller 12 determines if BP$_{cur}$<BP$_{static}$. For cases where Vs is not equal to 0 at 720, the most recent value BP$_{static}$ stored at the controller 12 may be utilized. For the case where BP$_{cur}$<BP$_{static}$, method 700 continues at 760 where the controller 12 updates the value of the static barometric pressure by setting BP$_{static}$=BP$_{cur}$. Returning to 750, for the case where BP$_{cur}$ is not less than BP$_{static}$, and following 760, method 700 continues at 770 where the controller 12 calculates BP$_{cur}$−BP$_{static}$. At 780, the controller 12 utilizes the model to estimate Vs by looking up a predicted value of Vs in the model data tables (e.g., data table 210) based on the value of BP$_{cur}$−BP$_{static}$ (the apparent ram-air pressure) at the current altitude. As an example, for a vehicle driving at an altitude of 10,000 feet, the estimated Vs would be 100 mph given a BP$_{cur}$−BP$_{static}$ of 0.267 inHg (reference data table 210, data row 214). After 780, method 700 continues to method 800.

Figure 8:
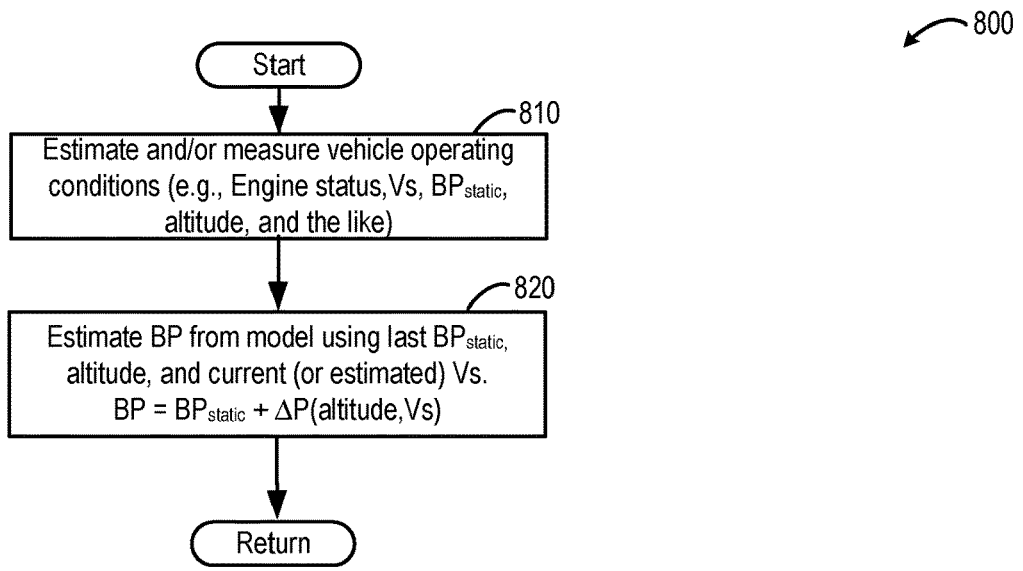

Turning now to FIG. 8, it illustrates a flow chart for an example method 800 of estimating BP. In one example, method 800 is executed in response to diagnosing a faulty or degraded BP and/or Vs measurement at 480 of method 400 (after executing method 600 of FIG. 6). Method 800 begins at 810, where the controller 12 estimates and/or measures various engine operating conditions such as the engine status, vehicle speed (Vs), barometric pressure (BP$_{meas}$), altitude, and the like. Method 800 continues at 820 where an estimate of BP is generated from the model based on the last known value of BP static, static, and the current altitude and current (or estimated) Vs. In particular, BP can be estimated utilizing equation (4):

$$BP=BP_{static}+P_{ram-air}(altitude, Vs) \quad (4)$$

In equation (4), P$_{ram-air}$ may be estimated from the data table 210 populated by the model based on the altitude and determined Vs. In this way, any measurement-related or sensor-related errors associated with the BP measurement and/or BP sensor may be preserved across vehicle speeds.

Figure 9:
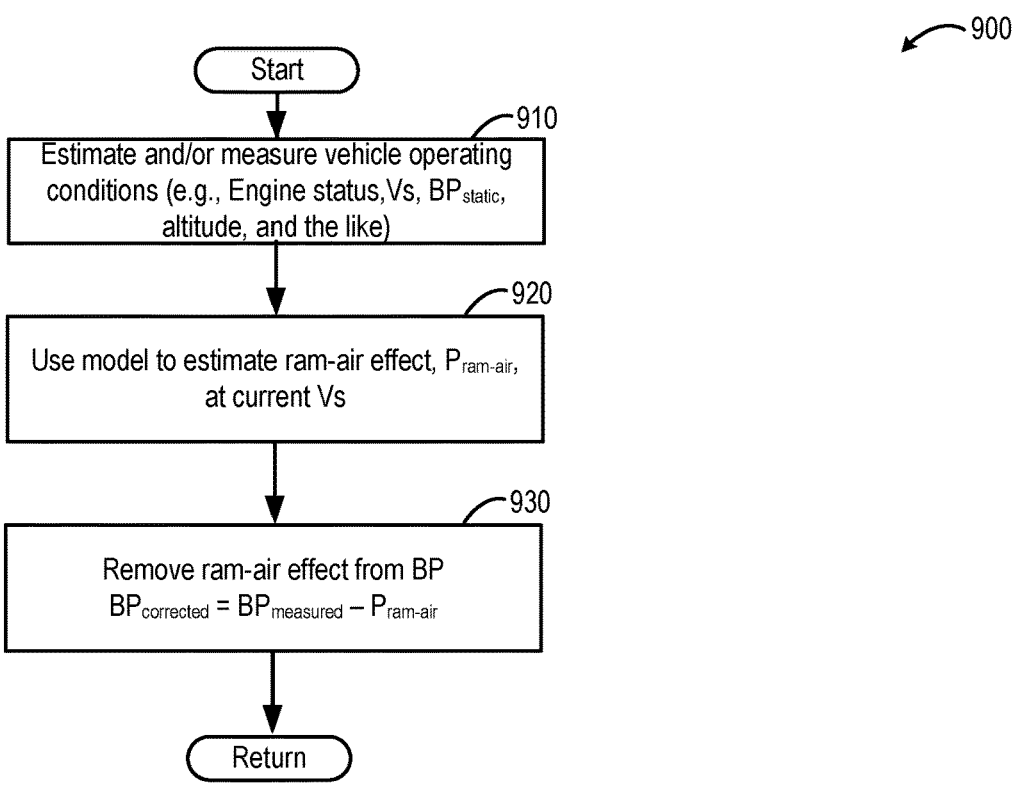

Turning now to FIG. 9, it illustrates a flow chart for an example method 900 of estimating BP. In one example, method 900 is executed in response to diagnosing that BP and/or Vs measurement are not faulty at 480 of method 400 (after executing method 600 of FIG. 6). Method 900 begins at 910, where the controller 12 estimates and/or measures various engine operating conditions such as the engine status, vehicle speed (Vs), barometric pressure (BP$_{meas}$), altitude, and the like. Method 900 continues at 920 where the controller 12 utilizes the model to estimate P$_{ram-air}$ based on the current Vs and altitude. As shown in data table 210, ram-air pressure can be determined by looking up, and interpolating and/or extrapolating, P$_{ram-air}$ as a function of Vs and altitude. As one example, referring to data table 210 (e.g., data row 216), P$_{ram-air}$ is 0.131 inHg at a vehicle speed of 70 mph and at an altitude of 10,000 feet. After 920, method 900 continues at 930 where the controller 12 determines a corrected BP, BP$_{corrected}$, by subtracting the ram-air pressure from the measured BP, BP$_{corrected}$=BP$_{meas}$−P$_{ram-air}$. In this way, an accurate and reliable value for BP can be obtained, which can aid in engine and vehicle operating strategies. After 930, method 900 returns to method 400 after 440.

Figure 10:
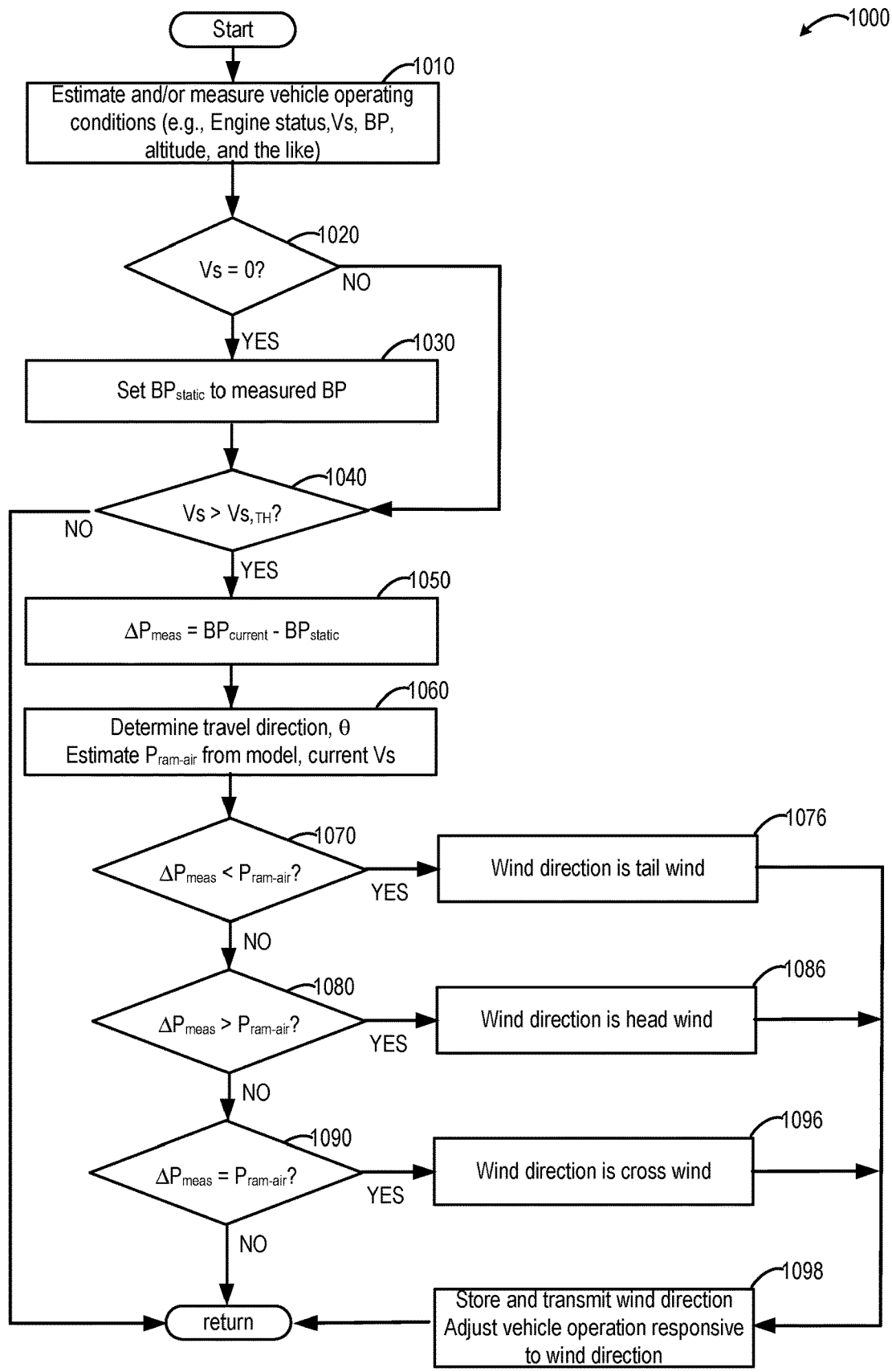

Turning now to FIG. 10, it illustrates a flow chart for an example method 1000 of determining a wind direction. In one example, method 1000 is executed in response to diagnosing that BP and/or Vs measurement are not faulty at 480 of method 400 (after executing method 600 of FIG. 6). Method 1000 begins at 1010, where the controller 12 estimates and/or measures various engine operating conditions such as the engine status, vehicle speed (Vs), barometric pressure (BP$_{meas}$), altitude, and the like. Method 1000 continues at 1020 where the controller 12 determines if a vehicle speed, Vs=0. For the case where Vs=0, method 1000 continues at 1030 where the controller 12 sets the static barometric pressure, BP$_{static}$=BP$_{meas}$.

Returning to 1020, for the case where Vs is not=0, and following 1030, method 1000 continues at 1040 where the controller determines if the vehicle speed, Vs, is greater than a threshold vehicle speed, Vs$_{TH}$. Method 1000 estimates the wind direction based on a magnitude of the measured change in BP with vehicle speed relative to a static BP relative to a change in BP with vehicle speed predicted by the model. When Vs>Vs$_{TH}$, the change in BP with vehicle speed is larger, and both measurement and prediction of the change in BP with vehicle speed can be performed more reliably. In contrast, when Vs<Vs$_{TH}$, the change in BP with vehicle speed is smaller, and both measurement and prediction of the change in BP with vehicle speed can be performed less reliably. In one example, Vs$_{TH}$ includes 50 mph. As shown by data table 210, when Vs>50 mph, the change in BP with vehicle speed (at constant altitude) is greater than 0.067 inHg at 10,000 ft. altitude, and greater than 0.090 in Hg at sea level. This relationship between BP with vehicle speed is maintained over changes in altitude of roughly +/−1000 feet, as indicated by FIG. 2. For the case where Vs<Vs$_{TH}$, method 1000 returns to method 400 after 450. For the case where Vs>Vs$_{TH}$, method 1000 continues at 1050 where the controller 12 calculates the measured change in BP, ΔP$_{meas}$=BP$_{current}$−BP$_{static}$. ΔP$_{meas}$ further represents the measured change in ram-air pressure with vehicle speed.

Next, method 1000 continues at 1060 where the controller 12 determines the current vehicle travel direction, θ, and estimates a ram-air pressure, P$_{ram-air}$ from the model based on the vehicle speed and altitude. As described above with reference to FIG. 1, the controller 12 may determine θ by way of a direction sensor 98, such as a compass or GPS device. The controller 12 may determine P$_{ram-air}$ utilizing the model by looking up and/or interpolating the data from data table 210 based on the altitude and vehicle speed.

Next, method 1000 determines the wind direction based on the relative magnitudes of the measured $\Delta P_{meas}$ relative to the model-predicted $P_{ram-air}$. At 1070, the controller 12 determines if $\Delta P_{meas} < P_{ram-air}$. For the case where $\Delta P_{meas} < P_{ram-air}$, method 1000 continues to 1076 where the controller 12 indicates that the wind direction is a tail wind, indicating that the wind direction prevails in a direction more towards the measured vehicle direction, $\theta$. In the case of a tail wind prevailing in a direction more towards the measured vehicle direction $\theta$, a magnitude of the air velocity relative to the vehicle is less than the vehicle speed, causing $\Delta P_{meas} < P_{ram-air}$. In one example, the controller 12 determining that $\Delta P_{meas} < P_{ram-air}$ includes determining that $\Delta P_{meas} < P_{ram-air}$ only when $\Delta P_{meas}$ is less than $P_{ram-air}$ by more than a threshold pressure sensitivity, $\delta$. The threshold pressure sensitivity $\delta$ may represent a pressure difference above which $\Delta P_{meas}$ and $P_{ram-air}$ may be reliably differentiated based on BP, altitude, Vs, and other sensor sensitivities, as well as fluctuating Vs, altitude, and wind speeds. As such, when $\Delta P_{meas}$ is less than $P_{ram-air}$ by more than the threshold pressure sensitivity $\delta$, the wind direction may be more reliably determined as a tail wind. Conversely, when $\Delta P_{meas}$ is not less than $P_{ram-air}$ by more than the threshold pressure sensitivity $\delta$, the wind direction may be less reliably determined as a tail wind.

Returning to 1070, for the case where $\Delta P_{meas}$ is not less $P_{ram-air}$ (or $\Delta P_{meas}$ is not less than $P_{ram-air}$ by the threshold pressure sensitivity $\delta$), method 1000 continues at 1080 where the controller 12 determines if $\Delta P_{meas} > P_{ram-air}$. For the case where $\Delta P_{meas} > P_{ram-air}$, method 1000 continues to 1086 where the controller 12 indicates that the wind direction is a head wind, indicating that the wind direction prevails in a direction more away from the measured vehicle direction, $\theta$. In the case of a head wind prevailing in a direction more away from the measured vehicle direction $\theta$, a magnitude of the air velocity relative to the vehicle is greater than the vehicle speed, causing $\Delta P_{meas} > P_{ram-air}$. In one example, the controller 12 determining that $\Delta P_{meas} > P_{ram-air}$ includes determining that $\Delta P_{meas} > P_{ram-air}$ only when $\Delta P_{meas}$ is greater than $P_{ram-air}$ by more than the threshold pressure sensitivity $\delta$. As such, when $\Delta P_{meas}$ is greater than $P_{ram-air}$ by more than the threshold pressure sensitivity $\delta$, the wind direction may be more reliably determined as a head wind. Conversely, when $\Delta P_{meas}$ is not greater than $P_{ram-air}$ by more than the threshold pressure sensitivity $\delta$, the wind direction may be less reliably determined as a head wind.

Returning to 1080, for the case where $\Delta P_{meas}$ is not greater $P_{ram-air}$ (or $\Delta P_{meas}$ is not greater than $P_{ram-air}$ by the threshold pressure sensitivity $\delta$), method 1000 continues at 1090 where the controller 12 determines if $\Delta P_{meas} = P_{ram-air}$. For the case where $\Delta P_{meas} = P_{ram-air}$, method 1000 continues to 1096 where the controller 12 indicates that the wind direction is a cross wind, indicating that the wind direction prevails in a direction substantially perpendicular to the measured vehicle direction, $\theta$. In the case of a cross wind prevailing in a direction substantially perpendicular to the measured vehicle direction $\theta$, a magnitude of the air velocity relative to the vehicle is substantially equivalent to the vehicle speed, causing $\Delta P_{meas} = P_{ram-air}$. In one example, the controller 12 determining that $\Delta P_{meas} = P_{ram-air}$ includes determining that a difference between $\Delta P_{meas}$ and $P_{ram-air}$ is less than the threshold pressure sensitivity $\delta$. In other words, $(P_{ram-air}-\delta) < \Delta P_{meas} < (P_{ram-air}-\delta)$. Because $\Delta P_{meas}$ is not greater than or less than $P_{ram-air}$ by more than the threshold pressure sensitivity $\delta$, the wind direction may be more reliably determined to be substantially in a cross wind direction perpendicular to the vehicle direction.

After 1076, 1086, and 1096, method 1000 continues at 1098 where the wind direction is stored in memory at the controller 12. Furthermore, the wind direction may be transmitted to an external database by the controller 12 such as a weather cloud system for tracking and monitoring weather. In one example, the weather cloud system may receive wind and other weather data from many vehicles and may output aggregated wind and other weather pertinent data back to the vehicles. Further still, the controller 12 may adjust vehicle operation responsive to the wind direction. In one example, routing and/or scheduling of a vehicle trip may be adjusted based on the wind direction to aid fuel economy. In another example, the controller 12 may adjust a cruise control algorithm; for instance, the controller 12 may reduce a forward gain in the cruise control algorithm during a tail wind, and may increase the forward gain during a head wind. Returning to 1090 for the case where $\Delta P_{meas}$ is not equal to $P_{ram-air}$ (or a difference between $\Delta P_{meas}$ and $P_{ram-air}$ is greater than the threshold pressure sensitivity), and after 1098, method 1000 returns to method 400 after 450.

In some examples, the magnitude of difference between $\Delta P_{meas}$ and $P_{ram-air}$ can indicate an upper threshold wind speed for the case where the wind direction is a precise head or tail wind. For example, when $\Delta P_{meas}$ is greater than $P_{ram-air}$, and if a precise head wind is presumed, then a speed of the head wind can be found by looking up the apparent vehicle speed corresponding to $\Delta P_{meas}$ and subtracting the measured Vs from the apparent vehicle speed. For the case where a wind direction is known from external sources, the magnitude of the wind may be determined from the magnitude of difference between $\Delta P_{meas}$ and $P_{ram-air}$.

Turning now to FIG. 12, it illustrates a schematic of the wind direction criteria for a vehicle 5 oriented with a vehicle direction, $\theta$, as described with reference to FIG. 10. Dashed arrows 1212, 1222, and 1232 indicate example tail wind directions in tail wind region 1210, substantially cross wind directions in cross wind region 1220, and head wind directions in head wind region 1230, respectively. In other words, tail wind region 1210 includes wind directions 1212 above dotted line 1216, head wind region 1230 includes wind directions 1232 below dotted line 1226, and cross wind region 1230 includes wind directions 1222 between dotted lines 1216 and 1226. During execution of method 1000, the controller 12 determines a tail wind when $\Delta P_{meas} < (P_{ram-air}-\delta)$, a cross wind when $(P_{ram-air}-\delta) < \Delta P_{meas} < (P_{ram-air}-\delta)$, and a head wind when $\Delta P_{meas} > (P_{ram-air}+\delta)$.

Figure 11:
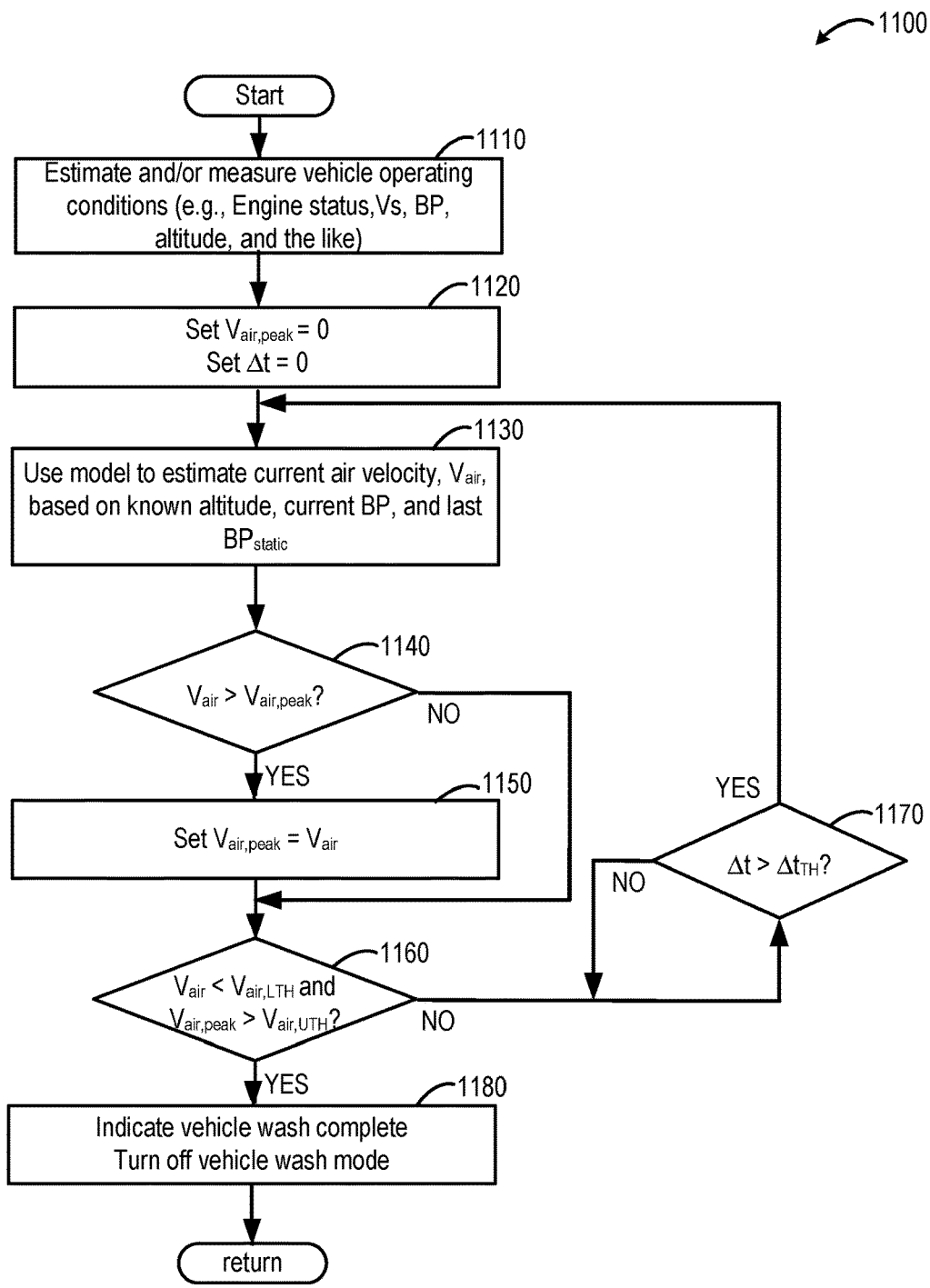

Turning now to FIG. 11, it illustrates a flow chart for an example method 1100 of determining when a vehicle wash has ended. Referring to FIG. 13, during a vehicle wash, such as an automated vehicle wash system 1300, a vehicle 5 may enter the automated vehicle wash system 1300 by way of an entry region 1310. Upon reaching an entry 1342, a conveying system 1304 may automatically convey the vehicle 5 in a vehicle direction $\theta$ slowly through a tunnel 1302 of the automated vehicle wash system 1300 where the vehicle is wetted, washed, waxed, dried, and the like in various stages (delineated in FIG. 13 by dotted vertical lines) 1320, 1330, and 1340 of the automated vehicle wash system 1300. The automated vehicle was system may include one or more stages 1320 and 1330 where the vehicle 5 is wetted, washed, waxed and the like by way of various nozzles 1322 and 1332 that apply water, soap, wax, and the like on to the vehicle 5, and by way of various applicators 1324 and 1334 such as rotating brushes, mops, sponges, towels, and the like. Near the terminus (e.g., exit threshold 1352) of the system, the vehicle may be dried in one or more drying stages 1340 by nozzles 1344 that deliver impinging air 1346 in a substantially −θ direction across the external surface of vehicle 5. In one example, nozzles 1344 may deliver impinging air 1346 at air velocities beyond an upper threshold air velocity, $V_{air,UTH}$. Once the drying stage has ended and/or after vehicle 5 has been conveyed beyond the nozzles 1344, a velocity of the impinging air 1346 delivered by the nozzles may decrease to below a lower threshold air velocity, $V_{air,LTH}$. Following the drying stages 1340, the vehicle 5 exits the tunnel 1302 to an exit region 1350, crossing an exit threshold 1352 after which the conveying system 1304 ceases to convey the vehicle 5. As depicted in FIG. 13, vehicle 5 may be transmitting and receiving signals to and from a V2X communication cloud 1380, such as indicating when a vehicle wash mode is ON or OFF, and the like. In one example, the automatic vehicle wash system 1300 may include V2X communication cloud 1380.

As described further below with reference to FIG. 11, the model may be utilized during vehicle wash mode to detect a completion of the vehicle wash based on an estimate of the velocity of the air impinging on the vehicle. In one example, method 1100 is executed in response to determining that a vehicle wash mode is ON at 460 of method 400. Method 1100 begins at 1110, where the controller 12 estimates and/or measures various engine operating conditions such as the engine status, vehicle speed (Vs), barometric pressure ($BP_{meas}$), altitude, and the like. Method 1100 continues at 1120 where a peak air velocity impinging on the vehicle, $V_{air,peak}$, is set to 0, and an elapsed duration, Δt, is set to 0. Next, method 1100 continues at 1130 where the controller 12 utilizes the model to estimate the current air velocity, $V_{air}$ based on the vehicle altitude, current BP (e.g., $BP_{meas}$), and most recent value of $BP_{static}$. As described above with reference to the model, the vehicle speed, Vs, may also be understood to represent the velocity of the vehicle relative to the air impinging on the vehicle, for example, the velocity of air 1346 impinging on the vehicle by way of nozzles 1344 in drying stage 1340. During vehicle wash mode, the vehicle may be stationary or traveling very slowly as it is conveyed automatically by way of conveying system 1304 through the vehicle wash system; as such, during the vehicle washing, including when the vehicle is conveyed through stages 1320 and 1330, the measured barometric pressure arising from vehicle motion is essentially the static barometric pressure. Near the terminus (e.g., exit threshold 1352) of the vehicle wash system, when air is impinged on the vehicle during a drying stage 1340, an increase in ram-air pressure arising from the air impinging on the vehicle may be measured and/or inferred by the vehicle BP sensors. As the vehicle speed is near 0, the model can thus be utilized to predict a velocity of the air impinging on the vehicle corresponding to the increase in $BP_{meas}$ relative to $BP_{static}$ due to the increase ram-air pressure. As an example, during a condition when vehicle wash mode is ON, $BP_{static}$ is 29.000 (sea level altitude), and $BP_{meas}$=29.130, the controller 12 (e.g., referring to data table 210, data row 218) may determine that $V_{air}$ is 60 mph.

Next, method 1100 continues at 1140 where the controller 12 determines if $V_{air}$ is greater than the peak air velocity, $V_{air,peak}$. For the case where $V_{air}>V_{air,peak}$, method 1100 continues at 1150 where the controller 12 sets $V_{air,peak}=V_{air}$. Following 1150 and for the case where $V_{air}$ is not greater than $V_{air,peak}$ at 1140, method 1100 continues at 1160 where the controller 12 determines if $V_{air}$ is less than a lower threshold air velocity, $V_{air,LTH}$, and if $V_{air,peak}$ is greater than an upper threshold air velocity, $V_{air,UTH}$. $V_{air,LTH}$ may correspond to an air velocity below which is indicative that the air impinging on the vehicle for drying at the terminus (e.g., exit threshold 1352) of the vehicle wash system is OFF. In one example, $V_{air,LTH}$ may be 0; in another example, $V_{air,LTH}$ may be equivalent to a speed that a vehicle is conveyed through the vehicle wash system. In this way, $V_{air,LTH}$ may include less than 3 mph. In contrast, $V_{air,UTH}$ may correspond to an air velocity above which is indicative that drying stage of the automatic vehicle wash system has started. In one example, $V_{air,UTH}$ may include 50 mph; in a preferred example, $V_{air,UTH}$ may include 30 mph. For the case where $V_{air}<V_{air,LTH}$ and $V_{air,peak}>V_{air,UTH}$ method 1100 proceeds to 1180 where the controller 12 indicates that the vehicle wash is ended and switches the vehicle wash mode to OFF. Returning to 1160 for the case where method 1100 continues at 1170 where the controller 12 determines if an elapsed time since last determining if $V_{air}<V_{air,LTH}$ and $V_{air,peak}>V_{air,UTH}$, Δt, is greater than a threshold elapsed time, $\Delta t_{TH}$. $\Delta t_{TH}$ may correspond to a time delay to wait for a drying stage of the vehicle wash system to end. In one example, Atm may include 100 ms. For the case where Δt is not greater than $\Delta t_{TH}$ method 1100 returns to 1170 to continue to determine if $\Delta t_{TH}>\Delta t_{TH}$. For the case where $\Delta t_{TH}>\Delta t_{TH}$, method 1100 returns to 1130 to re-estimate $V_{air}$, $V_{air,peak}$, current BP, and the like. As such, the controller 12 may repeatedly verify if the automatic vehicle wash has been ended. After 1180, method 1100 returns to method 400 after 470.

In this way, the technical effect of reliably determining a vehicle speed and a barometric pressure over a broad range of vehicle operating conditions, can be achieved. Furthermore, faulty vehicle speed and barometric pressure measurements can be timely diagnosed. Further still, in the event of these degraded measurements or sensors, reliable estimates of the vehicle speed and barometric pressure can be readily provided without additional sensors or devices, thereby reducing vehicle manufacturing costs and complexity. Further still, existing vehicle systems may be retrofitted with the methods and systems herein, in particular, while utilizing existing BP and Vs sensors and technology.

In this manner, a method for a vehicle comprises measuring a change in a barometric pressure resulting from a measured change in a vehicle speed, modeling the change in the barometric pressure based on a change in a ram-air pressure resulting from the change in the vehicle speed, and indicating a degraded barometric pressure measurement when a difference between the measured and the modeled change in the barometric pressure is greater than a threshold pressure difference. In a first example, the method further comprises indicating a degraded vehicle speed measurement when a difference between the measured and the modeled change in the barometric pressure is greater than the threshold pressure difference. In a second example, optionally including the first example, the method further comprises, wherein measuring the change in the barometric pressure resulting from the change in the vehicle speed includes measuring a static barometric pressure at a zero vehicle speed. In a third example, optionally including one or more of the first and second examples, the method further comprises, wherein modeling the change in the barometric pressure includes correlating the barometric pressure to the vehicle speed based on the change in the ram-air pressure across changes in a vehicle altitude. In a fourth example, optionally including one or more of the first through third examples, the method further comprises, wherein measuring the change in the barometric pressure resulting from the measured change in the vehicle speed includes measuring the change in the barometric pressure resulting from the measured change in the vehicle speed during a condition when the vehicle altitude varies less than a threshold altitude change. In a fifth example, optionally including one or more of the first through fourth examples, the method further comprises, in response to indicating the degraded barometric pressure measurement, utilizing the modeled change in the barometric pressure to estimate the change in the barometric pressure based on the vehicle altitude, the vehicle speed, and the static barometric pressure. In a sixth example, optionally including one or more of the first through fifth examples, the method further comprises, wherein in response to indicating the degraded vehicle speed measurement, utilizing the modeled change in the barometric pressure to estimate the vehicle speed based on the vehicle altitude, the static barometric pressure, and the barometric pressure.

In this manner, a method for a vehicle comprises generating a model correlating a ram-air pressure to a vehicle speed, measuring a barometric pressure at a first vehicle speed, and determining the barometric pressure by subtracting the ram-air pressure corresponding to the first vehicle speed from the measured barometric pressure, wherein the ram-air pressure corresponding to the first vehicle speed is determined from the model. In a first example, the method further comprises indicating a degraded barometric pressure measurement when a difference between the measured barometric pressure less a static barometric pressure and the modeled ram-air pressure is greater than a threshold pressure difference. In a second example, optionally including the first example, the method further comprises determining a wind direction based on the model, wherein determining the wind direction includes indicating a tail wind in response to the barometric pressure less a static barometric pressure being below the ram-air pressure corresponding to the first vehicle speed. In a third example, optionally including one or more of the first and second examples, the method further comprises wherein determining the wind direction includes indicating a head wind in response to the barometric pressure less the static barometric pressure being above the ram-air pressure corresponding to the first vehicle speed. In a third example, optionally including one or more of the first and second examples, the method further comprises, wherein determining the wind direction includes indicating a cross wind in response to the barometric pressure less the static barometric pressure being equal to the ram-air pressure corresponding to the first vehicle speed. In a fourth example, optionally including one or more of the first through third examples, the method further comprises, wherein determining the wind direction includes determining the wind direction during a condition when the first vehicle speed is greater than a threshold vehicle speed.

In this manner, a vehicle system comprises a barometric pressure sensor, a vehicle speed sensor, and a controller, including executable instructions residing in non-transitory memory thereon to, measure a change in a barometric pressure with the barometric pressure sensor resulting from a change in a vehicle speed measured with the vehicle speed sensor, model the change in the barometric pressure based on a change in a ram-air pressure resulting from the change in the vehicle speed relative to an air velocity, and indicate one of a degraded barometric pressure sensor measurement and a degraded vehicle speed sensor measurement when a difference between the measured and the modeled change in the barometric pressure is greater than a threshold pressure difference. In a first example, the system further comprises an altitude sensor, wherein the executable instructions to model the change in the barometric pressure includes correlating the barometric pressure to the vehicle speed based on the change in the ram-air pressure across changes in a vehicle altitude measured by the altitude sensor. In a second example, optionally including the first example, the system further includes, wherein the executable instructions to measure the change in the barometric pressure resulting from the measured change in the vehicle speed includes measuring the change in the barometric pressure resulting from the measured change in the vehicle speed during a condition when the vehicle altitude measured by the altitude sensor varies less than a threshold altitude change. In a third example, optionally including one or more of the first and second examples, the system further includes, wherein the executable instructions further comprise, in response to a vehicle wash mode being on, determining the air velocity impinging on the vehicle system from the measured change in the barometric pressure. In a fourth example, optionally including one or more of the first through third examples, the system further includes, wherein the executable instructions further include, in response to the vehicle wash mode being on, switching a vehicle wash mode off responsive to when the air velocity impinging on the vehicle system decreases below a lower threshold air velocity after the air velocity increases above an upper threshold air velocity. In a fifth example, optionally including one or more of the first through fourth examples, the system further includes, wherein the executable instructions to determine the air velocity impinging on the vehicle system include, determining the air velocity impinging on the vehicle system each time a threshold duration elapses. In a sixth example, optionally including one or more of the first through fifth examples, the system further includes, wherein the executable instructions further include determining the barometric pressure by subtracting the change in the ram-air pressure from the measured change in the barometric pressure, wherein the ram-air pressure corresponding to the vehicle speed is determined from the model.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations, and/or functions may be repeatedly performed depending on the particular strategy being used. Further, the described actions, operations, and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. Moreover, unless explicitly stated to the contrary, the terms "first," "second," "third," and the like are not intended to denote any order, position, quantity, or importance, but rather are used merely as labels to distinguish one element from another. The subject matter of the present disclosure includes all novel and non-obvious combinations and sub-combinations of the various systems and configurations, and other features, functions, and/or properties disclosed herein.

As used herein, the term "approximately" is construed to mean plus or minus five percent of the range unless otherwise specified.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for a vehicle, comprising:
   measuring a change in a barometric pressure resulting from a measured change in a vehicle speed,
   modeling the change in the barometric pressure based on a change in a ram-air pressure resulting from the change in the vehicle speed, and
   indicating a degraded barometric pressure measurement and a degraded vehicle speed measurement when a difference between the measured and the modeled change in the barometric pressure is greater than a threshold pressure difference.

2. The method of claim 1, wherein measuring the change in the barometric pressure resulting from the change in the vehicle speed includes measuring a static barometric pressure at a zero vehicle speed.

3. The method of claim 2, wherein modeling the change in the barometric pressure includes correlating the barometric pressure to the vehicle speed based on the change in the ram-air pressure across changes in a vehicle altitude.

4. The method of claim 3, wherein measuring the change in the barometric pressure resulting from the measured change in the vehicle speed includes measuring the change in the barometric pressure resulting from the measured change in the vehicle speed during a condition when the vehicle altitude varies less than a threshold altitude change.

5. The method of claim 4, further comprising, in response to indicating the degraded barometric pressure measurement, utilizing the modeled change in the barometric pressure to estimate the change in the barometric pressure based on the vehicle altitude, the vehicle speed, and the static barometric pressure.

6. The method of claim 5, wherein, in response to indicating the degraded vehicle speed measurement, utilizing the modeled change in the barometric pressure to estimate the vehicle speed based on the vehicle altitude, the static barometric pressure, and the barometric pressure.

7. A vehicle system, comprising:
   a barometric pressure sensor, a vehicle speed sensor, and an altitude sensor; and
   a controller, including executable instructions residing in non-transitory memory thereon to,
      measure a change in a barometric pressure with the barometric pressure sensor resulting from a change in a vehicle speed measured with the vehicle speed sensor,
      model the change in the barometric pressure based on a change in a ram-air pressure resulting from the change in the vehicle speed relative to an air velocity,
      correlate the barometric pressure to the vehicle speed based on the change in the ram-air pressure across changes in a vehicle altitude measured by the altitude sensor, and
      indicate one of a degraded barometric pressure sensor measurement and a degraded vehicle speed sensor measurement when a difference between the measured and the modeled change in the barometric pressure is greater than a threshold pressure difference.

8. The vehicle system of claim 7, wherein the executable instructions to measure the change in the barometric pressure resulting from the measured change in the vehicle speed includes measuring the change in the barometric pressure resulting from the measured change in the vehicle speed during a condition when the vehicle altitude measured by the altitude sensor varies less than a threshold altitude change.

9. The vehicle system of claim 7, wherein the executable instructions further comprise, in response to a vehicle wash mode being on, determining the air velocity impinging on the vehicle system from the measured change in the barometric pressure.

10. The vehicle system of claim 9, wherein the executable instructions further include, in response to the vehicle wash mode being on, switching the vehicle wash mode off responsive to when the air velocity impinging on the vehicle system decreases below a lower threshold air velocity after the air velocity increases above an upper threshold air velocity.

11. The vehicle system of claim 10, wherein the executable instructions to determine the air velocity impinging on the vehicle system include determining the air velocity impinging on the vehicle system each time a threshold duration elapses.

12. The vehicle system of claim 7, wherein the executable instructions further include determining the barometric pressure by subtracting the change in the ram-air pressure from the measured change in the barometric pressure, and wherein the ram-air pressure corresponding to the vehicle speed is determined from the model.

13. A method for a vehicle, comprising:
   generating a model correlating a ram-air pressure to a vehicle speed,
   measuring a barometric pressure at a first vehicle speed,
   determining the barometric pressure by subtracting the ram-air pressure corresponding to the first vehicle speed from the measured barometric pressure, wherein the ram-air pressure corresponding to the first vehicle speed is determined from the model, and
   determining a wind direction based on the model, wherein determining the wind direction includes indicating a tail wind in response to the barometric pressure less a static barometric pressure being below the ram-air pressure corresponding to the first vehicle speed.

14. The method of claim 13, further comprising indicating a degraded barometric pressure measurement when a difference between the measured barometric pressure less a static barometric pressure and the modeled ram-air pressure is greater than a threshold pressure difference.

15. The method of claim 13, wherein determining the wind direction includes indicating a head wind in response to the barometric pressure less the static barometric pressure being above the ram-air pressure corresponding to the first vehicle speed.

16. The method of claim 13, wherein determining the wind direction includes indicating a cross wind in response to the barometric pressure less the static barometric pressure being equal to the ram-air pressure corresponding to the first vehicle speed.

17. The method of claim 13, wherein determining the wind direction includes determining the wind direction during a condition when the first vehicle speed is greater than a threshold vehicle speed.

* * * * *